United States Patent
Nakagaki et al.

(10) Patent No.: US 11,307,304 B2
(45) Date of Patent: Apr. 19, 2022

(54) OBJECT DETECTION DEVICE

(71) Applicant: AISIN CORPORATION, Kariya (JP)

(72) Inventors: Kaoru Nakagaki, Kariya (JP); Moritaka Miwa, Kariya (JP); Masato Sugiyama, Kariya (JP); Tsubasa Kamiya, Kariya (JP)

(73) Assignee: AISIN CORPORATION, Kariya (JP)

( * ) Notice: Subject to any disclaimer, the term of this patent is extended or adjusted under 35 U.S.C. 154(b) by 154 days.

(21) Appl. No.: 16/660,862

(22) Filed: Oct. 23, 2019

(65) Prior Publication Data

US 2020/0132834 A1 Apr. 30, 2020

(30) Foreign Application Priority Data

Oct. 26, 2018 (JP) .............................. JP2018-202002

(51) Int. Cl.
| | |
|---|---|
| *G01S 13/931* | (2020.01) |
| *G01S 13/34* | (2006.01) |
| *G01S 15/931* | (2020.01) |
| *G06K 9/00* | (2022.01) |
| *G01S 13/00* | (2006.01) |
| *G01S 15/00* | (2020.01) |

(52) U.S. Cl.
CPC ............ *G01S 13/931* (2013.01); *G01S 13/34* (2013.01); *G01S 15/931* (2013.01); *G06K 9/00805* (2013.01); *G01S 2013/932* (2020.01); *G01S 2013/93271* (2020.01)

(58) Field of Classification Search
CPC ..... G01S 13/003; G01S 15/003; G01S 13/878
See application file for complete search history.

(56) References Cited

U.S. PATENT DOCUMENTS

| | | | | |
|---|---|---|---|---|
| 6,545,633 B1 * | 4/2003 | Jensen | ................ | G01S 13/003 |
| | | | | 342/118 |
| 2003/0222778 A1 * | 12/2003 | Piesinger | ............. | G01S 13/878 |
| | | | | 340/541 |

FOREIGN PATENT DOCUMENTS

| | | | | |
|---|---|---|---|---|
| JP | 2005-076408 A | | 3/2005 | |
| WO | WO2017/114762 A1 * | | 7/2017 | ........... G01S 13/003 |

OTHER PUBLICATIONS

U.S. Appl. No. 16/660,866, filed Oct. 23, 2019, Tsubasa Kamiya, et al.

* cited by examiner

*Primary Examiner* — Bernarr E Gregory
(74) *Attorney, Agent, or Firm* — Oblon, McClelland, Maier & Neustadt, L.L.P.

(57) ABSTRACT

An object detection device includes: first and second transmission/reception units transmitting and receiving an exploration wave to detect a peripheral object; and a processing unit determining a position of an object based on reception results of the first and second transmission/reception units. The processing unit calculates a first point based on first and second exploration waves, calculates a second point based on third and fourth exploration waves, determines that the object exists on a line segment interconnecting the first and second points when a distance between the first and second points is less than a predetermined value, and determines that the object exists on the line segment and line segments extended from both ends of the line segment when the distance between the first and second points is equal to or greater than the predetermined value.

6 Claims, 17 Drawing Sheets

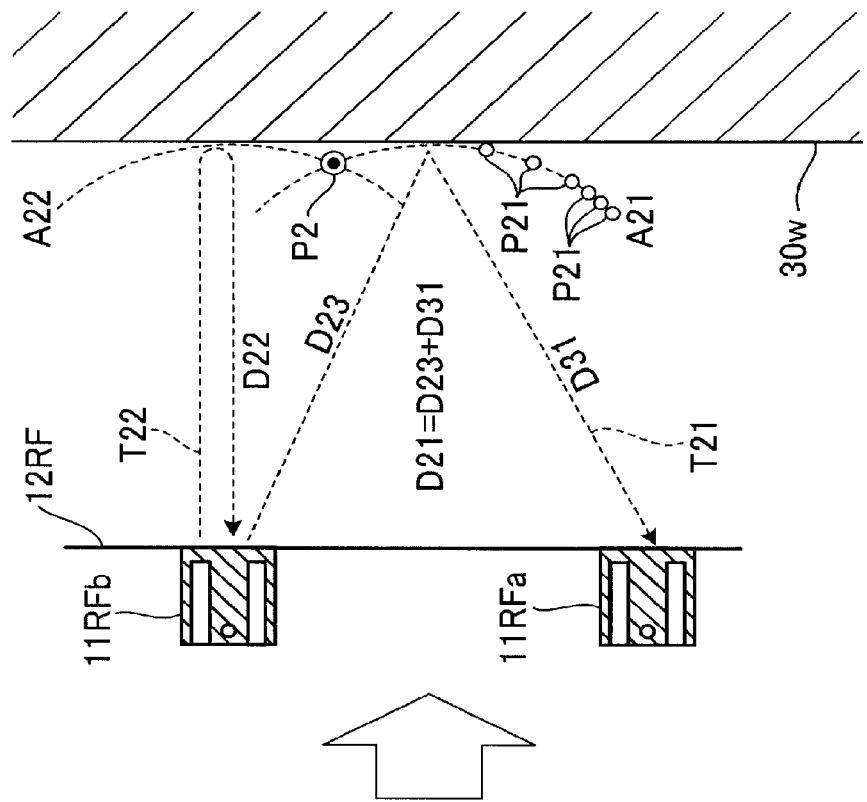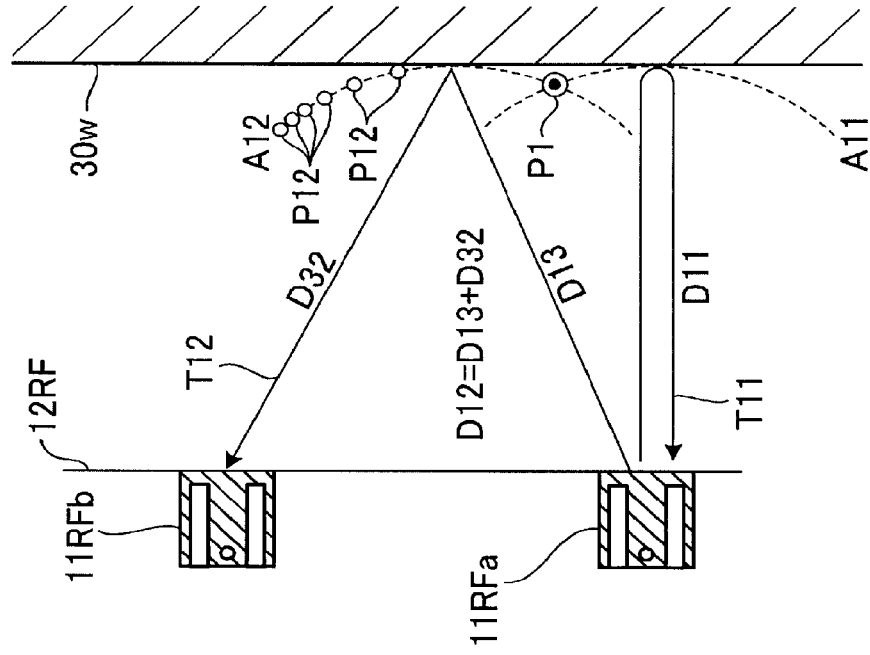

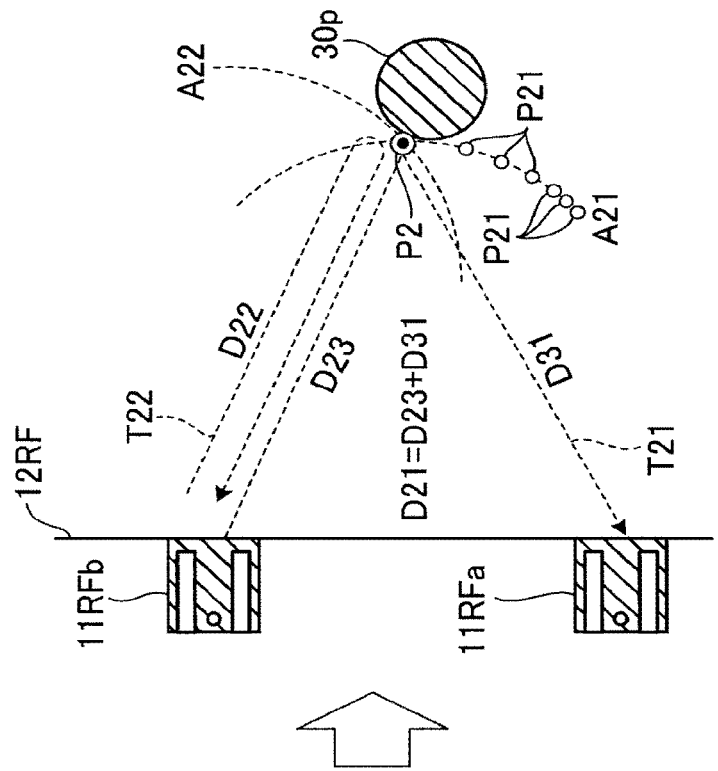
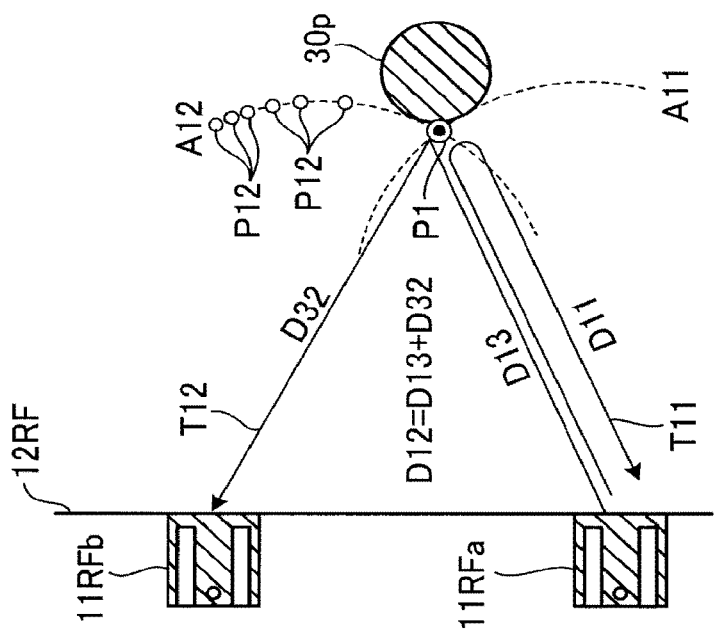

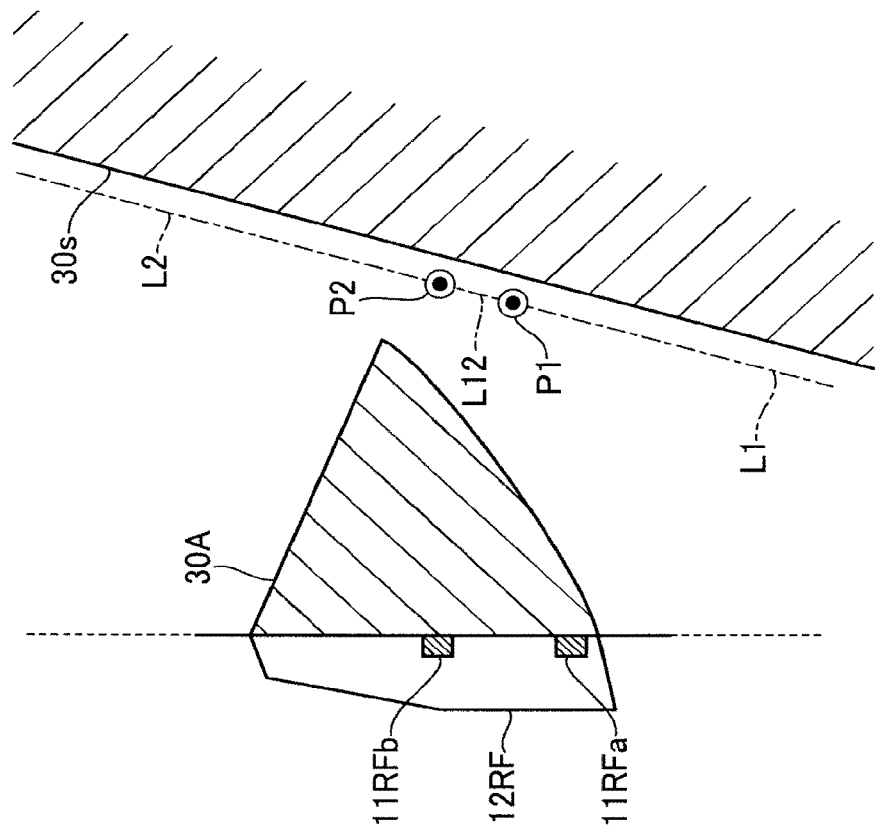
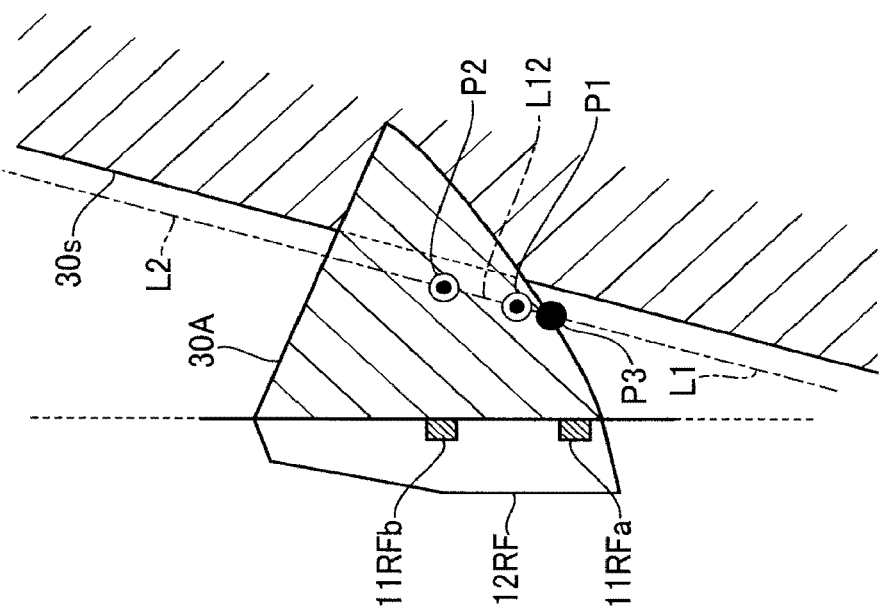

OBJECT DETECTION DEVICE

CROSS REFERENCE TO RELATED APPLICATIONS

This application is based on and claims priority under 35 U.S.C. § 119 to Japanese Patent Application 2018-202002, filed on Oct. 26, 2018, the entire contents of which are incorporated herein by reference.

TECHNICAL FIELD

Embodiments of this disclosure relate to an object detection device.

BACKGROUND DISCUSSION

A technology of measuring a distance to an object by transmitting exploration waves such as ultrasonic waves to the object and receiving the exploration waves reflected by the object is known. See, for example, JP 2005-076408A (Reference 1).

The above-described technology of the related art has room for further improvement in terms of enhancing the accuracy of determination.

SUMMARY

An object detection device according to an aspect of this disclosure includes, as an example, a first transmission/reception unit configured to transmit and receive an exploration wave to detect a peripheral object, a second transmission/reception unit spaced apart from the first transmission/reception unit by a predetermined distance and configured to transmit and receive an exploration wave to detect a peripheral object, and a processing unit configured to determine a position of an object based on reception results of the first transmission/reception unit and the second transmission/reception unit, and the processing unit is configured to calculate a first point based on a first exploration wave transmitted from the first transmission/reception unit and received primally by the first transmission/reception unit and a second exploration wave transmitted from the first transmission/reception unit and received primally by the second transmission/reception unit, calculate a second point based on a third exploration wave transmitted from the second transmission/reception unit and received primally by the second transmission/reception unit and a fourth exploration wave transmitted from the second transmission/reception unit and received primally by the first transmission/reception unit, determine that the object exists on a line segment interconnecting the first point and the second point when a distance between the first point and the second point is less than a predetermined value, and determine that the object exists on the line segment interconnecting the first point and the second point and line segments obtained by extending both ends of the line segment when the distance between the first point and the second point is equal to or greater than the predetermined value.

BRIEF DESCRIPTION OF THE DRAWINGS

The foregoing and additional features and characteristics of this disclosure will become more apparent from the following detailed description considered with the reference to the accompanying drawings, wherein:

FIGS. 5A and 5B are views illustrating a state where the multiple transmission/reception units according to the embodiment perform transmission and reception;

FIGS. 9A and 9B are views illustrating a state where the multiple transmission/reception units according to the embodiment perform transmission and reception;

FIGS. 12A and 12B are views illustrating a state where a collision position between an object and a door is determined by the object detection unit according to the embodiment;

DETAILED DESCRIPTION

[Embodiment]

Hereinafter, an exemplary embodiment will be disclosed. A configuration of the embodiment described below and operations, results, and effects caused by the configuration are given as an example. The disclosure may also be realized by configurations other than the configuration disclosed in the following embodiment, and at least one of various effects based on a basic configuration and derivative effects may be obtained.

(Configuration of Vehicle)

Figure 1:
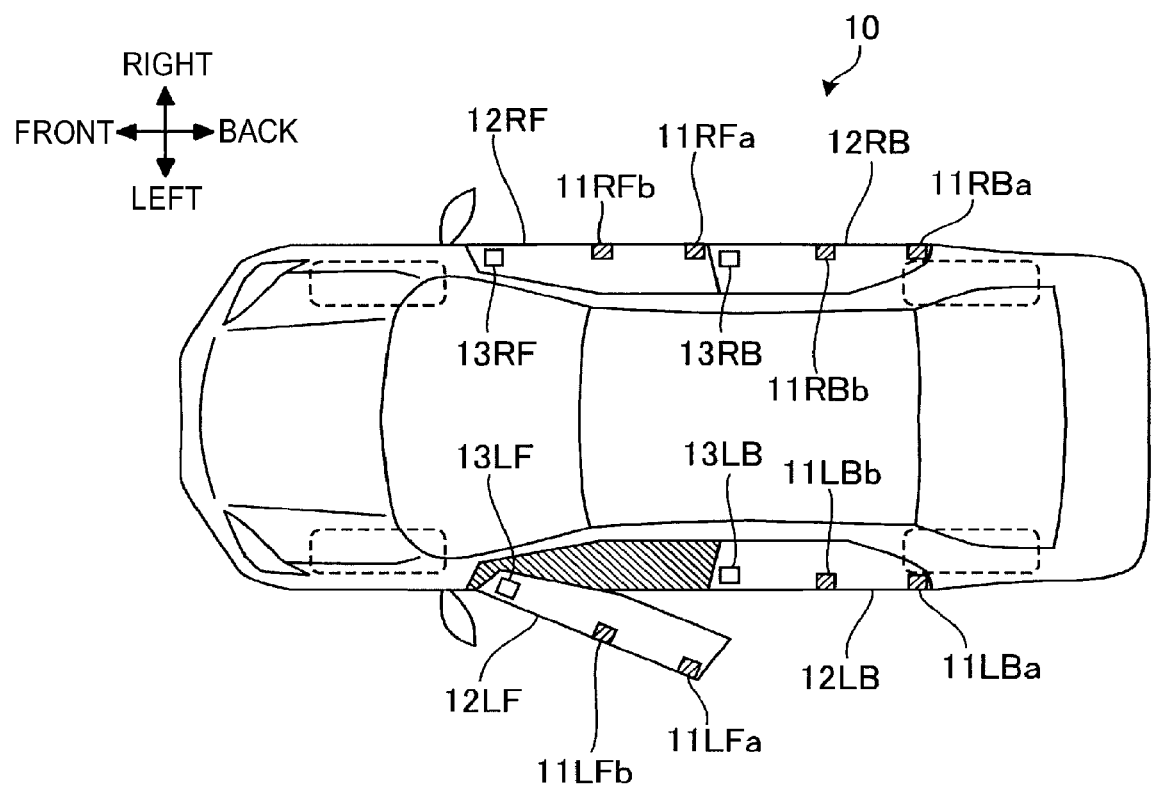
FIG. 1 is a top plan view of a vehicle in which an object detection device according to an embodiment is mounted.

FIG. 1 is a top plan view of a vehicle 10 in which an object detection device according to an embodiment is mounted.

Directions indicated by arrows in FIG. 1 are referred to as a longitudinal direction and a transverse direction of the vehicle 10.

As illustrated in FIG. 1, in the vehicle 10 in which the object detection device is mounted, multiple transmission/reception units 11RFa, 11RFb, 11RBa, 11RBb, 11LFa, 11LFb, 11LBa, and 11LBb included in the object detection device are provided on, for example, decorative plates of respective doors 12RF, 12RB, 12LF, and 12LB of the vehicle 10.

The transmission/reception unit 11RFa is provided, for example, near the opening/closing side end of the right front door 12RF. By fitting the transmission/reception unit 11RFa into the decorative plate of a lower portion of the door 12RF, the vertical position of the transmission/reception unit 11RFa may be set to the lower side position of the door 12RF. Alternatively, the vertical position of the transmission/reception unit 11RFa may be set to a center position with respect to the upper and lower ends of the door 12RF or the outermost deviated position of the door 12RF. The transmission/reception unit 11RFb is, for example, spaced apart from the transmission/reception unit 11RFa by a predetermined distance so as to be closer to the front side of the vehicle 10 than the transmission/reception unit 11RFa of the door 12RF. The vertical position of the transmission/reception unit 11RFb is, for example, the same as the vertical position of the transmission/reception unit 11RFa. The transmission/reception units 11LFa and 11LFb are provided, for example, on positions of the left front door 12LF corresponding to the respective transmission/reception units 11RFa and 11RFb.

The transmission/reception unit 11RBa is provided, for example, near the opening/closing side end of the right back door 12RB. By fitting the transmission/reception unit 11RBa into the decorative plate of a lower portion of the door 12RB, the vertical position of the transmission/reception unit 11RBa may be set to the lower side position of the door 12RB. Alternatively, the vertical position of the transmission/reception unit 11RBa may be set to a center position with respect to the upper and lower ends of the door 12RB or the outermost deviated position of the door 12RB. The transmission/reception unit 11RBb is, for example, spaced apart from the transmission/reception unit 11RBa by a predetermined distance so as to be closer to the front side of the vehicle 10 than the transmission/reception unit 11RBa of the door 12RB. The vertical position of the transmission/reception unit 11RBb is, for example, the same as the vertical position of the transmission/reception unit 11RBa. The transmission/reception units 11LBa and 11LBb are provided, for example, on positions of the left back door 12LB corresponding to the transmission/reception units 11RBa and 11RBb.

Hereinafter, when the multiple transmission/reception units 11RFa, 11RFb, 11RBa, 11RBb, 11LFa, 11LFb, 11LBa, and 11LBb are not particularly distinguished, they are simply described as transmission/reception units 11. Further, when the multiple doors 12RF, 12RB, 12LF, and 12LB are not particularly distinguished, they are simply described as doors 12.

The transmission/reception unit 11 is a sensor or a sonar that transmits exploration waves such as ultrasonic waves. Further, the transmission/reception unit 11 also functions as a receiver that receives an exploration wave reflected by an object. The transmission/reception unit 11 detects an object existing near each door 12 by transmitting and receiving an exploration wave around each door 12.

The vehicle 10 in which the object detection device is mounted is further provided, for example, inside outer panels of the respective doors 12RF, 12RB, 12LF, and 12LB of the vehicle 10 with multiple door opening degree adjustment units 13RF, 13RB, 13LF, and 13LB included in the object detection device.

The door opening degree adjustment unit 13RF is provided, for example, near the hinge side end of the right front door 12RF. The door opening degree adjustment unit 13RB is provided, for example, near the hinge side end of the right back door 12RB. The door opening degree adjustment unit 13LF is provided, for example, near the hinge side end of the left front door 12LF. The door opening degree adjustment unit 13LB is provided, for example, near the hinge side end of the left back door 12LB.

Hereinafter, when the multiple door opening degree adjustment units 13RF, 13RB, 13LF, and 13LB are not particularly distinguished, they are simply described as door opening degree adjustment units 13.

When an object that may be an obstacle exists near any one door 12, the door opening degree adjustment unit 13 adjusts the opening degree of the any one door 12 to avoid a collision between the door 12 and the object.

(Configuration of Object Detection Device)

Figure 2:
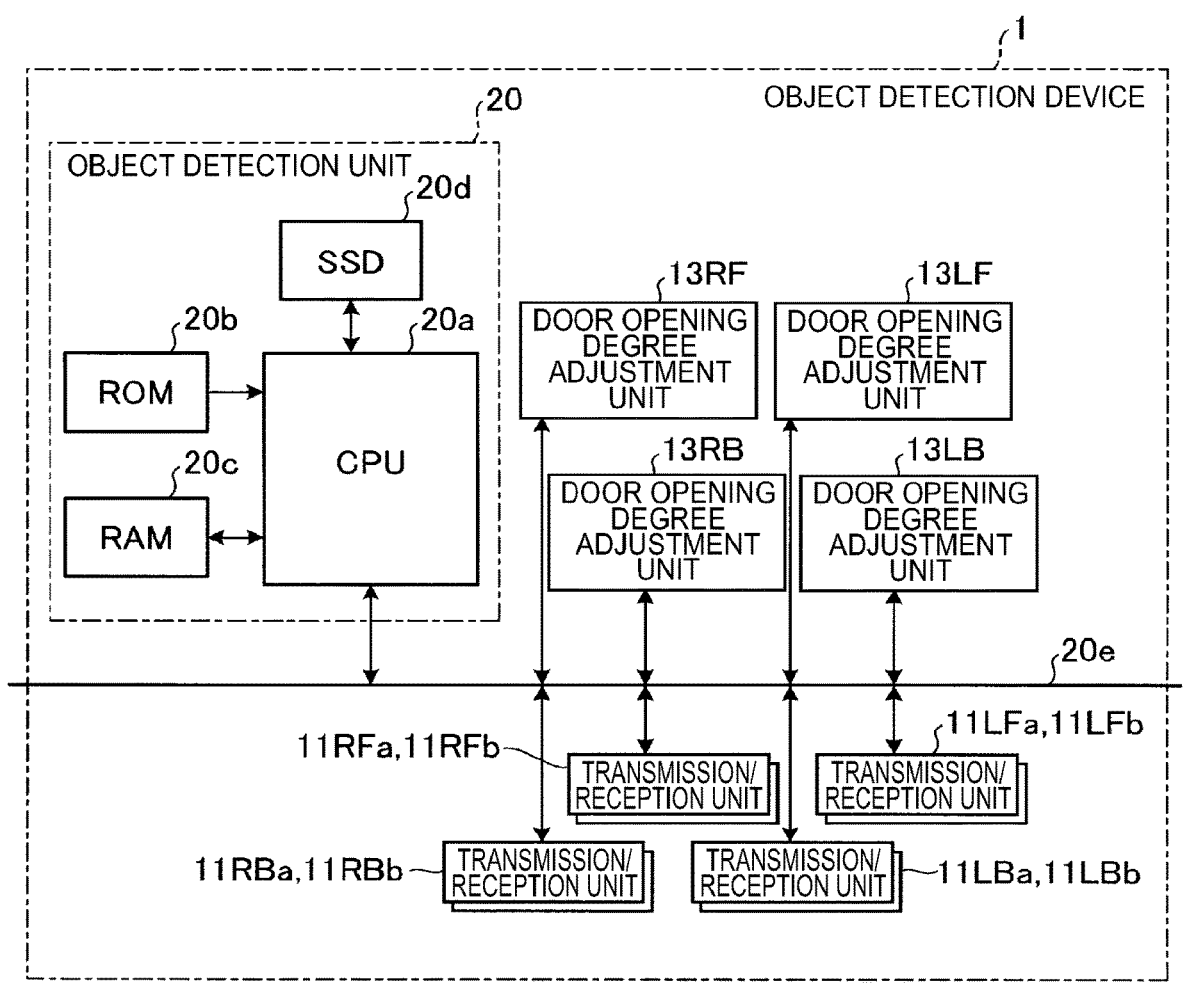
FIG. 2 is a block diagram illustrating a hardware configuration of the object detection device according to the embodiment.

FIG. 2 is a block diagram illustrating a hardware configuration of the object detection device 1 according to the embodiment. The object detection device 1 detects an object around each door 12 of the vehicle 10 by the transmission/reception unit 11. When detecting an object that may be an obstacle, the object detection device 1 avoids a collision with the object by the door opening degree adjustment unit 13.

As illustrated in FIG. 2, the object detection device 1 includes the multiple transmission/reception units 11RFa, 11RFb, 11RBa, 11RBb, 11LFa, 11LFb, 11LBa, and 11LBb, the multiple door opening degree adjustment units 13RF, 13RB, 13LF, and 13LB, an object detection unit 20, and an in-vehicle network 20e.

The multiple transmission/reception units 11 are connected to the in-vehicle network 20e. The multiple transmission/reception units 11 transmit transmission/reception information to the object detection unit 20 via the in-vehicle network 20e. The multiple door opening degree adjustment units 13 are connected to the in-vehicle network 20e. The multiple door opening degree adjusting units 13 adjust the opening degree of each door 12 under the control of the object detection unit 20 via the in-vehicle network 20e.

The object detection unit 20 determines the presence of an object and the position of an object based on the transmission/reception information acquired from each of the multiple transmission/reception units 11. The object detection unit 20 outputs information on a detected object to the door opening degree adjustment unit 13 to prevent a collision between the door 12 and the object.

The object detection unit 20 is a computer including a microcomputer such as an electronic control unit (ECU). The object detection unit 20 includes a central processing unit (CPU) 20a, a read only memory (ROM) 20b, a random access memory (RAM) 20c, and a solid state drive (SSD) 20d. The CPU 20a, the ROM 20b, and the RAM 20c may be integrated in the same package.

The CPU 20a is an example of a hardware processor, and reads a program stored in a nonvolatile storage device such as the ROM 20b and executes various arithmetic processings and controls according to the program.

The ROM 20b stores each program and parameters necessary for executing the program. The RAM 20c temporarily stores various types of data used in calculations performed by the CPU 20a. The SSD 20d is a rewritable nonvolatile storage device, and maintains data even when a power supply of the object detection unit 20 is turned off.

The in-vehicle network 20e is, for example, a controller area network (CAN). The in-vehicle network 20e electrically interconnects the multiple transmission/reception units 11, the multiple door opening degree adjustment units 13, and the object detection unit 20 to enable transmission and reception of signals and information therebetween.

Figure 3:
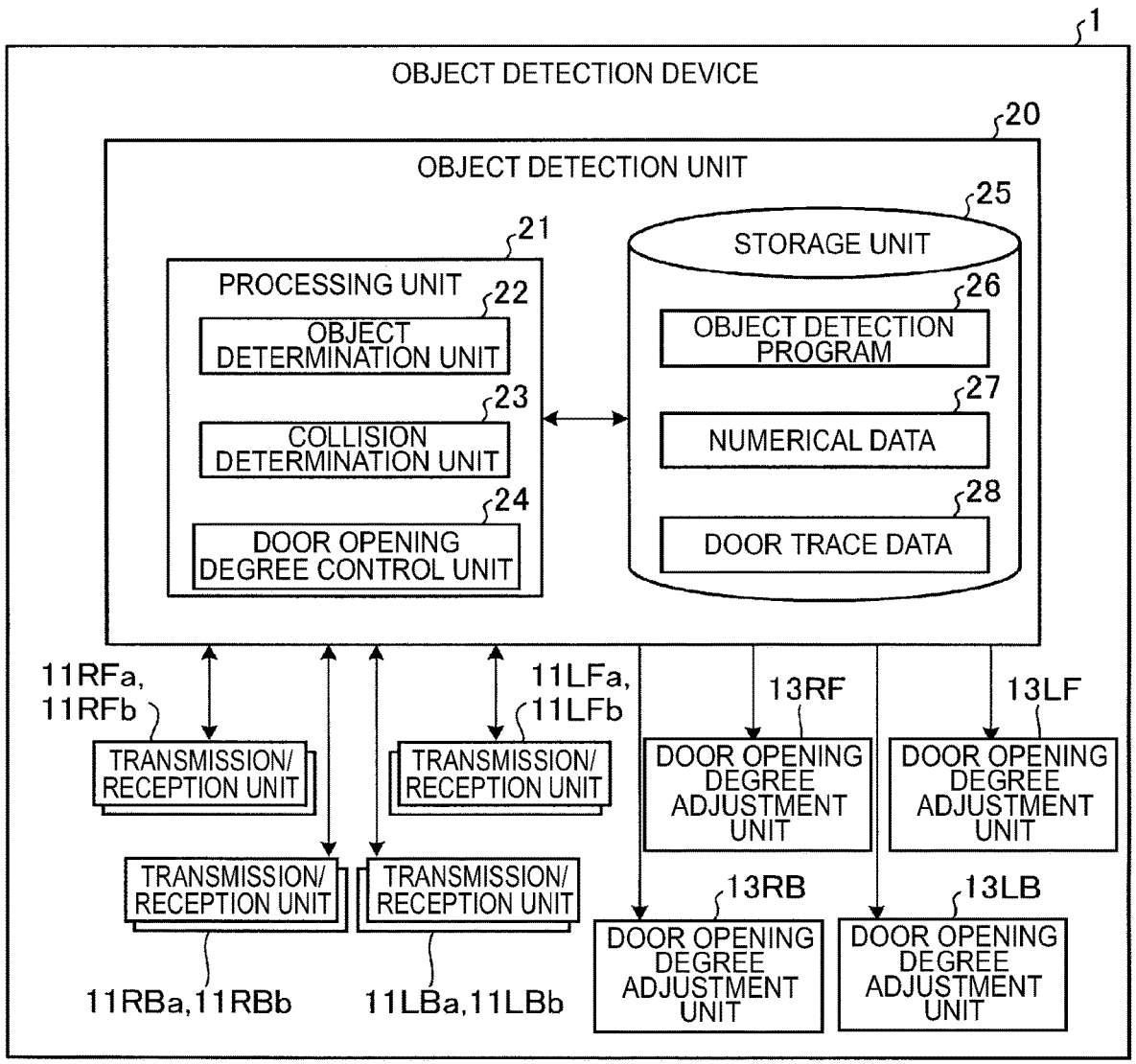
FIG. 3 is a functional block diagram for explaining functions of the object detection device according to the embodiment.

FIG. 3 is a functional block diagram for explaining functions of the object detection device 1 according to the embodiment. As illustrated in FIG. 3, the object detection unit 20 of the object detection device 1 includes a processing unit 21 and a storage unit 25.

The storage unit 25 stores a program executed by the processing unit 21 and data necessary for executing the program. For example, the storage unit 25 stores an object detection program 26 executed by the processing unit 21. The storage unit 25 stores numerical data 27 necessary for executing the object detection program 26. Further, the storage unit 25 stores door trace data 28 necessary for executing the object detection program 26.

The processing unit 21 realizes, for example, a function of the CPU 20a. The processing unit 21 includes an object determination unit 22, a collision determination unit 23, and a door opening degree control unit 24. For example, the processing unit 21 may function as the object determination unit 22, the collision determination unit 23, and the door opening degree control unit 24 by reading the object detection program 26 stored in the storage unit 25. Some or all of the object determination unit 22, the collision determination unit 23, and the door opening degree control unit 24 may be configured by hardware such as a circuit including an application specific integrated circuit (ASIC) or a field programmable gate array (FPGA).

The object determination unit 22 determines the position and external shape of a detected object based on the transmission/reception information from the respective transmission/reception units 11. Detailed functions of the object determination unit 22 will be described later.

When an object that may be an obstacle is detected near any one door 12, the collision determination unit 23 determines whether or not there is a possibility that the door 12 and the object collide when the door 12 is opened. When there is a possibility that the door 12 and the object collide, the collision determination unit 23 calculates a collision position between the door 12 and the object. Detailed functions of the collision determination unit 23 will be described later.

When the collision determination unit 23 calculates the collision position between the door 12 and the object, the door opening degree control unit 24 controls the door opening degree adjustment unit 13 to limit the opening degree of the door 12 so that the door 12 is stopped immediately before the collision position.

(Object Detection Method)

Next, an object detection method by the object detection device 1 will be described with reference to FIGS. 4 to 10. Hereinafter, an example in which object determination is performed mainly based on operations of the transmission/reception units 11RFa and 11RFb will be described, but an object may be detected by the same method even when the other transmission/reception units 11RBa, 11RBb, 11LFa, 11LFb, 11LBa, and 11LBb are used.

Figure 4:
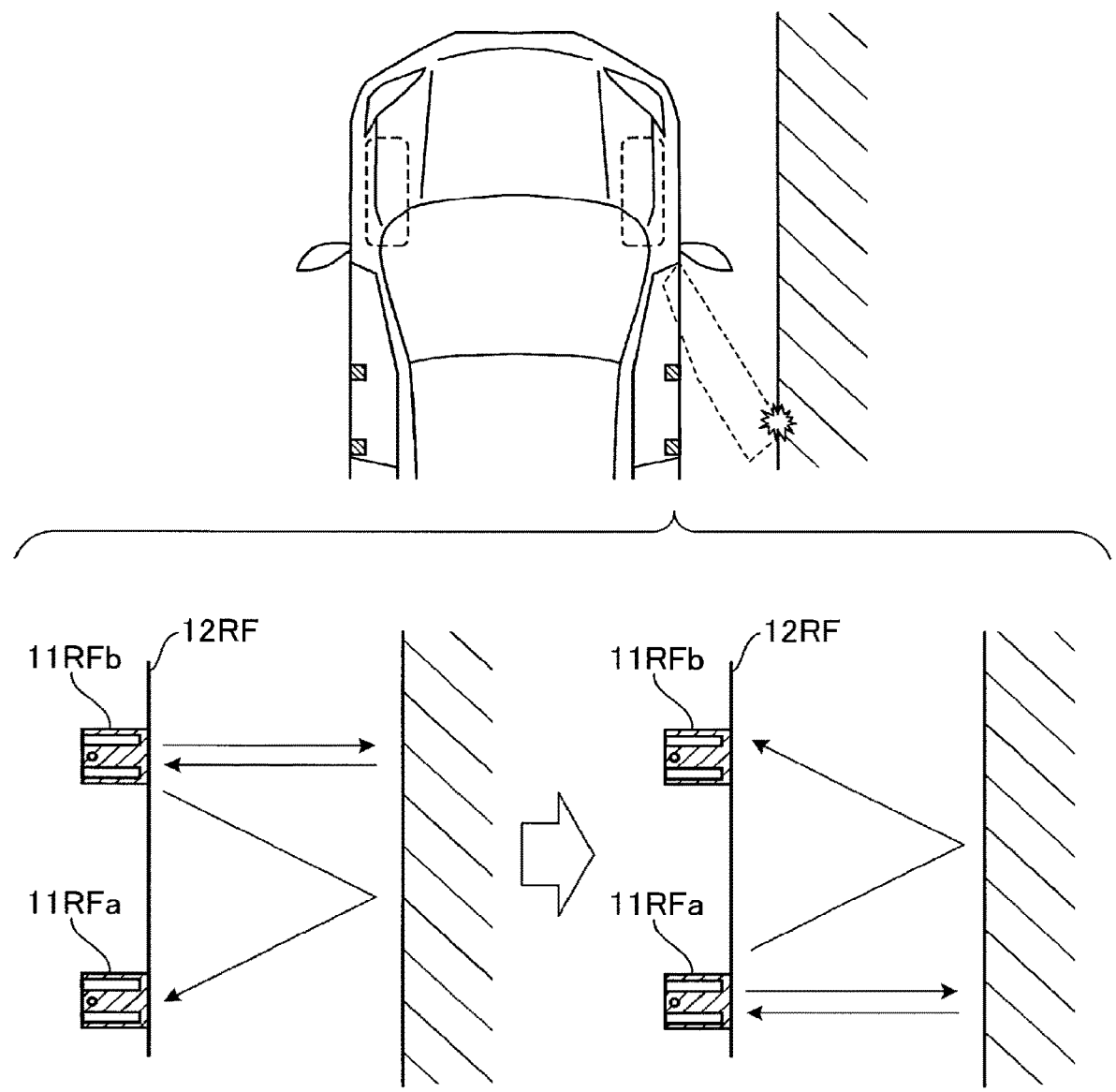
FIG. 4 is a view for explaining an outline of functions of multiple transmission/reception units according to the embodiment.

FIG. 4 is a view for explaining an outline of functions of the multiple transmission/reception units 11 according to the embodiment. As illustrated in FIG. 4, each of the multiple transmission/reception units 11 is configured to transmit an exploration wave radially toward the outside of the door 12 and also configured to receive the exploration wave directed thereto. At this time, among the multiple transmission/reception units 11, the transmission/reception units 11 provided on the same door 12 are configured to be paired and interworked. For example, two transmission/reception units 11RFa and 11RFb provided on the door 12RF illustrated in FIG. 4 operate in cooperation with each other. Thus, an object near the door 12RF is detected, and a collision between the object and the door 12RF is avoided.

Specifically, each of the transmission/reception units 11RFa and 11RFb alternately repeats a period for implementation of transmission and reception of an exploration wave and a period for implementation of only reception of an exploration wave. At this time, the transmission/reception unit 11RFa performs transmission and reception of an exploration wave for the period during which the transmission/reception unit 11RFb performs reception of an exploration wave. Further, the transmission/reception unit 11RFa performs only reception of an exploration wave for the period during which the transmission/reception unit 11RFb performs transmission and reception of an exploration wave. The transmission/reception unit 11RFb performs transmission and reception of an exploration wave for the period during which the transmission/reception unit 11RFa performs reception of an exploration wave. Further, the transmission/reception unit 11RFb performs only reception of an exploration wave for the period during which the transmission/reception unit 11RFa performs transmission and reception of an exploration wave. This state is illustrated in FIGS. 5A and 5B.

FIGS. 5A and 5B are views illustrating a state where multiple transmission/reception units 11RFa and 11RFb according to the embodiment perform transmission and reception. In FIGS. 5A and 5B, it is assumed that an object 30w such as a wall surface exists near the door 12RF and is parallel to the door 12RF.

FIG. 5A illustrates a state where the transmission/reception unit 11RFa performs transmission and reception and the transmission/reception unit 11RFb performs reception only. During this period, the transmission/reception units 11RFa and 11RFb receive various exploration waves reflected by the peripheral object 30w and the like. When receiving information on these various exploration waves as transmission/reception information, the object determination unit 22 of the processing unit 21 included in the object detection unit 20 determines that any object 30w exists near the door 12RF. Then, the object determination unit 22 extracts exploration waves received primally by the transmission/reception units 11RFa and 11RFb from among the received various exploration waves.

As illustrated in FIG. 5A, the transmission/reception unit 11RFa primally receives an exploration wave T11 which has been transmitted toward the position of the wall-surface-shaped object 30w closest to the transmission/reception unit 11RFa and has been reflected thereto. The object determination unit 22 obtains a distance D11 between the transmission/reception unit 11RFa and the object 30w based on the detected exploration wave T11. The distance D11 is a value that is a half of a numerical value obtained by multiplying the speed of sound by the time from when the transmission/reception unit 11RFa transmits an exploration wave to when the exploration wave T11 is received by the transmission/reception unit 11RFa. However, the direction in which the object 30w exists may not be specified only with such information. Therefore, the object determination unit 22 calculates a virtual arc A11 spaced apart from the transmission/reception unit 11RFa by the distance D11, and assumes that the object 30w exists at least at any one position on the arc A11.

Further, the transmission/reception unit 11RFb primally receives an exploration wave T12 which has reached the transmission/reception unit 11RFb through the shortest path among paths from the transmission/reception unit 11RFa to the transmission/reception unit 11RFb via the object 30w. Based on the detected exploration wave T12, the object determination unit 22 obtains the length of two sides of a triangle which uses the transmission/reception units 11RFa and 11RFb as two vertices and has the other vertex on the object 30w, i.e., the shortest distance D12=D13+D32 between the transmission/reception units 11RFa and 11RFb via the object 30w. The length D13+D32 of the two sides is a value obtained by multiplying the speed of sound by the time from when the transmission/reception unit 11RFa transmits an exploration wave to when the transmission/reception unit 11RFb receives the exploration wave T12. Next, the object determination unit 22 calculates the position of the other vertex of the triangle which uses the transmission/reception units 11RFa and 11RFb as two vertices. The position of the other vertex may be obtained by a trilateration method from the lengths D13 and D32 of the two sides using a known length of the side between the transmission/reception units 11RFa and 11RFb. However, since the respective lengths D13 and D32 of the two sides are not known, it is not possible to specify the position of the other vertex as one only with such information. That is, there are multiple triangles that have the obtained length D13+D32 of the two sides and have the other vertices at different positions. Therefore, the object determination unit 22 calculates a virtual arc A12 interconnecting the other vertices P12 of these multiple triangles, and assumes that the object 30w exists at least at any one position on the arc A12.

In addition, the object determination unit 22 estimates that the object 30w exists at a point P1 that is the intersection of the two calculated arcs A11 and A12. However, the point P1 is slightly ahead (closer to the door 12RF) the actual position of the object 30w.

FIG. 5B illustrates a state where the transmission/reception unit 11RFb performs transmission and reception and the transmission/reception unit 11RFa performs reception only. During this period, the transmission/reception units 11RFa and 11RFb receive various exploration waves reflected by the peripheral object 30w and the like. The object determination unit 22 receives information on these various exploration waves as transmission/reception information, and extracts exploration waves received primally by the transmission/reception units 11RFa and 11RFb among the various exploration waves.

As illustrated in FIG. 5B, the transmission/reception unit 11RFa primally receives an exploration wave T21 which has reached the transmission/reception unit 11RFa through the shortest path among paths from the transmission/reception unit 11RFb to the transmission/reception unit 11RFa by way of the object 30w. Based on the detected exploration wave T21, the object determination unit 22 obtains the length of two sides of a triangle which uses the transmission/reception units 11RFa and 11RFb as two vertices and has the other vertex on the object 30w, i.e., the shortest distance D21=D23+D32 between the transmission/reception units 11RFa and 11RFb by way of the object 30w. The length D23+D31 of the two sides is a value obtained by multiplying the speed of sound by the time from when the transmission/ reception unit 11RFb transmits an exploration wave to when the transmission/reception unit 11RFa receives the exploration wave T21. Next, the object determination unit 22 calculates the position of the other vertex of the triangle which uses the transmission/reception units 11RFa and 11RFb as two vertices. The position of the other vertex may also be obtained by a trilateration method from the lengths D23 and D31 of the two sides using a known length of the side between the transmission/reception units 11RFa and 11RFb. However, since the respective lengths D23 and D31 of the two sides are not known, it is not possible to specify the position of the other vertex as one only with such information. That is, there are multiple triangles that have the obtained length D23+D31 of the two sides and have the other vertices at different positions. Therefore, the object determination unit 22 calculates a virtual arc A21 interconnecting the other vertices P12 of these multiple triangles, and assumes that the object 30w exists at least at any one position on the arc A21.

As illustrated in FIG. 5B, the transmission/reception unit 11RFb primally receives an exploration wave T22 which has been transmitted toward the position of the wall-surface-shaped object 30w closest to the transmission/reception unit 11RFb and has been reflected thereto. The object determination unit 22 obtains a distance D22 between the transmission/reception unit 11RFb and the object 30w based on the detected exploration wave T22. The distance D22 is a value that is a half of a numerical value obtained by multiplying the speed of sound by the time from when the transmission/ reception unit 11RFb transmits an exploration wave to when the exploration wave T22 is received by the transmission/ reception unit 11RFb. However, the direction in which the object 30w exists may not be specified only with such information. Therefore, the object determination unit 22 calculates a virtual arc A22 spaced apart from the transmission/reception unit 11RFb by the distance D22, and assumes that the object 30w exists at least at any one position on the arc A22.

In addition, the object determination unit 22 estimates that the object 30w exists at a point P2 that is the intersection of the two calculated arcs A21 and A22. However, the point P2 is slightly ahead (closer to the door 12RF) the actual position of the object 30w.

As described above, the two points P1 and P2 are obtained as the positions where the object 30w exists. When the distance between these points P1 and P2 is equal to or greater than a predetermined value, i.e., when the points P1 and P2 are sufficiently separated from each other, it can be seen that the object 30w is an object having a wall surface that extends over a somewhat wide range. This state is illustrated in FIG. 6.

Figure 6:
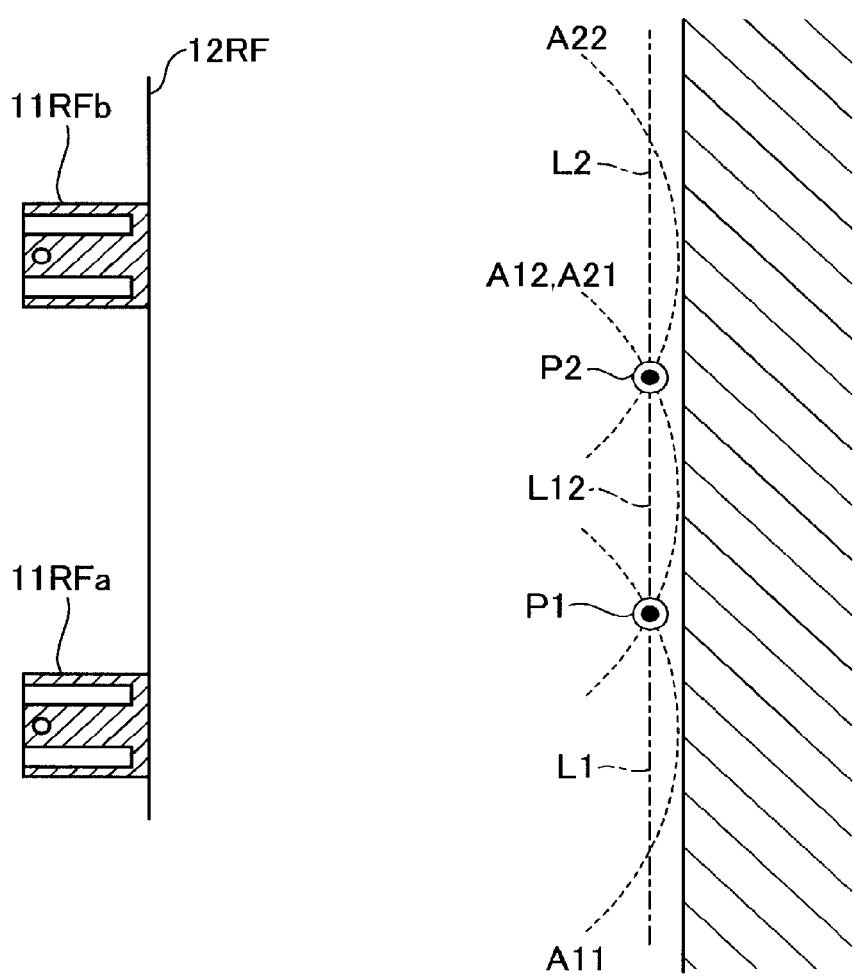
FIG. 6 is a view illustrating a state where an object is determined by an object detection unit according to the embodiment.
Figure 7:
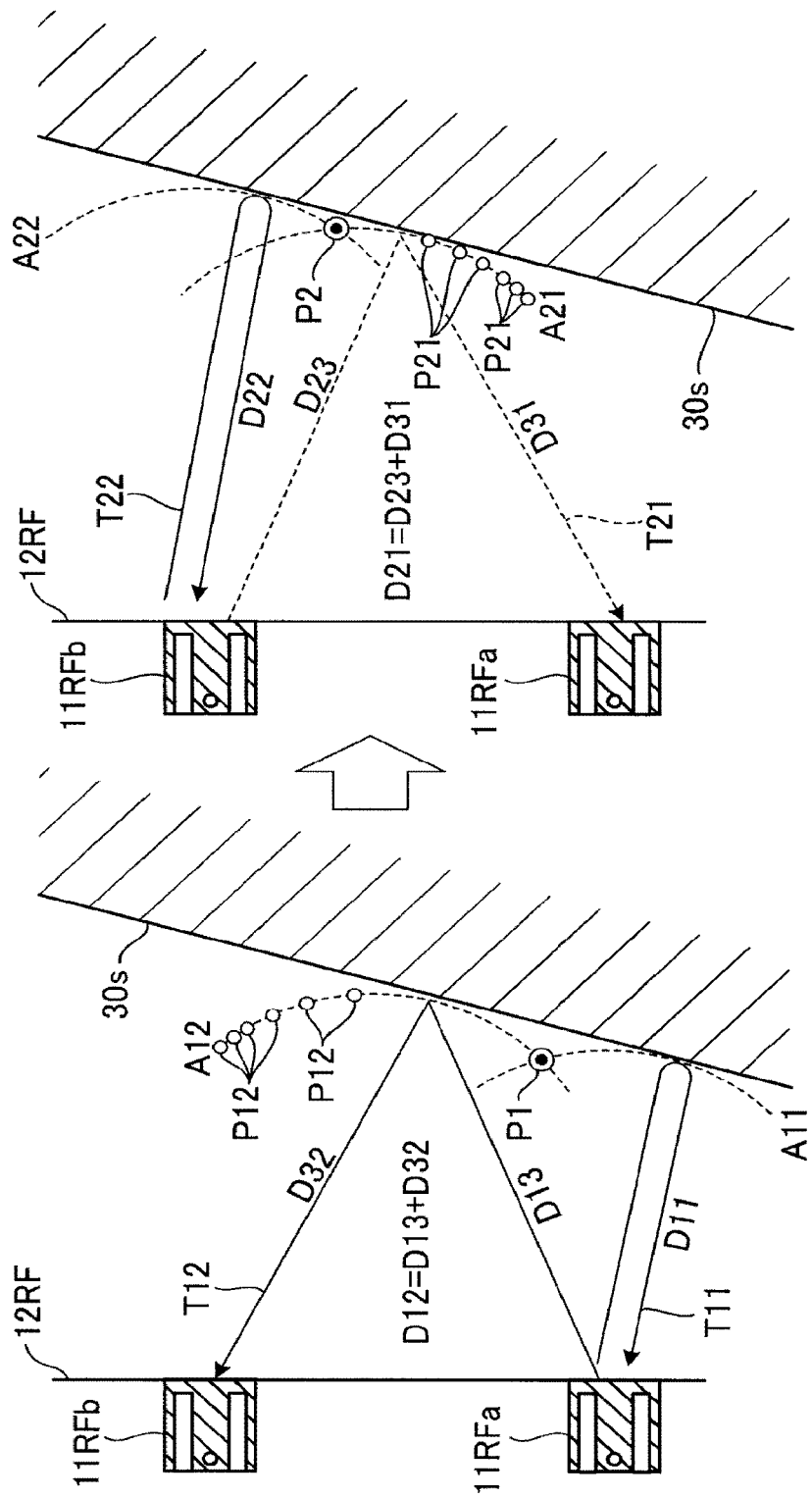
FIGS. 7A and 7B are views illustrating a state where the multiple transmission/reception units according to the embodiment perform transmission and reception.

FIG. 6 is a view illustrating a state where the object 30w is determined by the object detection unit 20 according to the embodiment. As illustrated in FIG. 6, the object determination unit 22 of the object detection unit 20 determines whether or not the distance between the points P1 and P2 is equal to or greater than a predetermined distance based on the obtained points P1 and P2. The predetermined distance is, for example, a threshold value stored in the numerical data 27 of the storage unit 25. When the distance between the points P1 and P2 is equal to or greater than the predetermined distance, the object determination unit 22 determines that the object 30w exists on a line segment L12 interconnecting the points P1 and P2 and line segments L1 and L2 obtained by extending both ends of the line segment L12 and has a certain area and is parallel to the door 12RF.

Next, a case where a wall-surface-shaped object exists obliquely with respect to the door 12RF will be described.

FIGS. 7A and 7B are views illustrating a state where multiple transmission/reception units 11RFa and 11RFb according to the embodiment perform transmission and reception. In FIGS. 7A and 7B, it is assumed that an object 30s such as a wall surface exists near the door 12RF and is obliquely with respect to the door 12RF.

FIG. 7A illustrates a state where the transmission/reception unit 11RFa performs transmission and reception and the transmission/reception unit 11RFb performs reception only. The object determination unit 22 extracts exploration waves received primally by the transmission/reception units 11RFa and 11RFb.

As illustrated in FIG. 7A, the transmission/reception unit 11RFa primally receives an exploration wave T11 passing through the shortest path between the transmission/reception unit 11RFa and the object 30s. The object determination unit 22 obtains a distance D11 between the transmission/reception unit 11RFa and the object 30s based on the detected exploration wave T11. Then, the object determination unit 22 calculates a virtual arc A11 spaced apart from the transmission/reception unit 11RFa by the distance D11.

Further, the transmission/reception unit 11RFb primally receives an exploration wave T12 which has reached the transmission/reception unit 11RFb through the shortest path from the transmission/reception unit 11RFa by way of the object 30w. Based on the detected exploration wave T12, the object determination unit 22 obtains the length D12=D13+D32 of two sides of a triangle that uses the transmission/reception units 11RFa and 11RFb as two vertices and has the other vertex on the object 30s. Then, the object determination unit 22 obtains the other vertices of multiple triangles by a trilateration method, and calculates a virtual arc A12 interconnecting these multiple vertices P12.

In addition, the object determination unit 22 estimates that the object 30s exists at a point P1 that is the intersection of the two calculated arcs A11 and A12. However, the point P1 is slightly ahead (closer to the door 12RF) the actual position of the object 30s.

FIG. 7B illustrates a state where the transmission/reception unit 11RFb performs transmission and reception and the transmission/reception unit 11RFa performs reception only. The object determination unit 22 extracts exploration waves received primally by the transmission/reception units 11RFa and 11RFb.

As illustrated in FIG. 7B, the transmission/reception unit 11RFa primally receives an exploration wave T21 which has reached the transmission/reception unit 11RFa through the shortest path from the transmission/reception unit 11RFb by way of the object 30s. Based on the detected exploration wave T21, the object determination unit 22 obtains the length of two sides D21=D23+D31 of a triangle that uses the transmission/reception units 11RFa and 11RFb as two vertices and has the other vertex on the object 30s. Then, the object determination unit 22 obtains the other vertex of multiple triangles by a trilateration method, and calculates a virtual arc A21 interconnecting these multiple vertices P21.

Further, the transmission/reception unit 11RFb primally receives an exploration wave T22 passing through the shortest path between the transmission/reception unit 11RFb and the object 30s. The object determination unit 22 obtains a distance D22 between the transmission/reception unit 11RFb and the object 30s based on the detected exploration wave T22. Then, the object determination unit 22 calculates a virtual arc A22 spaced apart from the transmission/reception unit 11RFb by the distance D22.

In addition, the object determination unit 22 estimates that the object 30s exists at a point P2 that is the intersection of the two calculated arcs A21 and A12. However, the point P2 is slightly ahead (closer to the door 12RF) the actual position of the object 30s.

Figure 8:
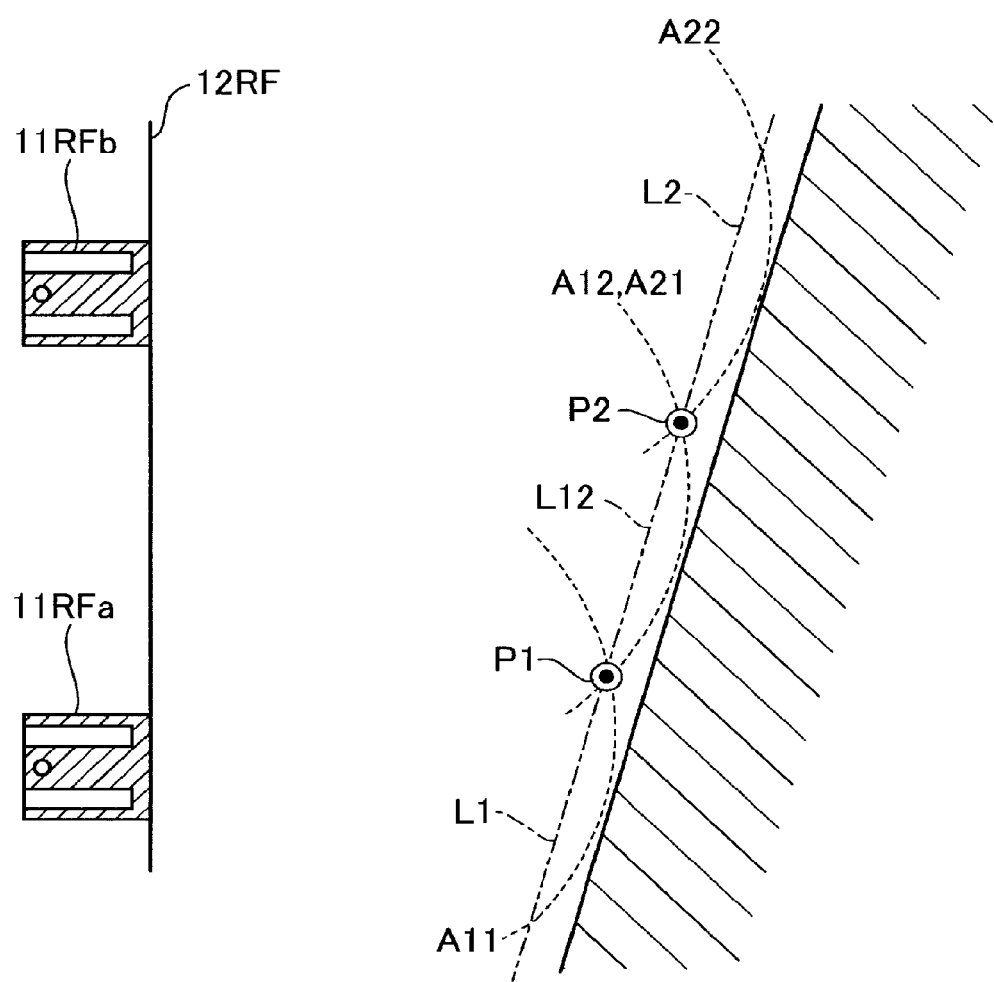
FIG. 8 is a view illustrating a state where an object is determined by the object detection unit according to the embodiment.

FIG. 8 is a view illustrating a state where the object 30s is determined by the object detection unit 20 according to the embodiment. When the distance between the obtained points P1 and P2 is equal to or greater than a predetermined value, the object determination unit 22 of the object detection unit 20 determines that the object 30s is an object having a wall surface that extends over a somewhat wide range. That is, as illustrated in FIG. 8, the object determination unit 22 of the object detection unit 20 determines, based on the obtained points P1 and P2, that the object 30s exists on a line segment L12 interconnecting the points P1 and P2 and line segments L1 and L2 obtained by extending both ends of the line segment L12 and has a certain area and is obliquely with respect to the door 12RF.

Next, a case where a pole-shaped object exists near the door 12RF will be described.

FIGS. 9A and 9B are views illustrating a state where multiple transmission/reception units 11RFa and 11RFb according to the embodiment perform transmission and reception. In FIGS. 9A and 9B, it is assumed that a rod-shaped object 30p such as a pole exists near the door 12RF.

FIG. 9A illustrates a state where the transmission/reception unit 11RFa performs transmission and reception and the transmission/reception unit 11RFb performs reception only. The object determination unit 22 extracts exploration waves T11 and T12 received primally by the transmission/reception units 11RFa and 11RFb.

As illustrated in FIG. 9A, the object determination unit 22 obtains a distance D11 between the transmission/reception unit 11RFa and the object 30p based on the detected exploration wave T11. Then, the object determination unit 22 calculates a virtual arc A11 spaced apart from the transmission/reception unit 11RFa by the distance D11.

Further, based on the detected exploration wave T12, the object determination unit 22 obtains the length D12=D13+D32 of two sides of a triangle that uses the transmission/reception units 11RFa and 11RFb as two vertices and has the other vertex on the object 30p. Then, the object determination unit 22 calculates a virtual arc A12 interconnecting the other vertices P12 of multiple triangles.

In addition, the object determination unit 22 estimates that the object 30p exists at a point P1 that is the intersection of the two calculated arcs A11 and A12. However, the point P1 is slightly ahead (closer to the door 12RF) the actual position of the object 30p.

FIG. 9B illustrates a state where the transmission/reception unit 11RFb performs transmission and reception and the transmission/reception unit 11RFa performs reception only. The object determination unit 22 extracts exploration waves T21 and T12 received primally by the transmission/reception units 11RFa and 11RFb.

As illustrated in FIG. 9B, based on the detected exploration wave T21, the object determination unit 22 obtains the length of two sides D21=D23+D31 of a triangle that uses the transmission/reception units 11RFa and 11RFb as two vertices and has the other vertex on the object 30p. Then, the object determination unit 22 calculates a virtual arc A21 interconnecting the other vertices P12 of multiple triangles.

Further, the object determination unit 22 obtains a distance D22 between the transmission/reception unit 11RFb and the object 30p based on the detected exploration wave T22. Then, the object determination unit 22 calculates a virtual arc A22 spaced apart from the transmission/reception unit 11RFb by the distance D22.

In addition, the object determination unit 22 estimates that the object 30p exists at a point P2 that is the intersection of the two calculated arcs A21 and A22. However, the point P2 is slightly ahead (closer to the door 12RF) the actual position of the object 30p.

Figure 10:
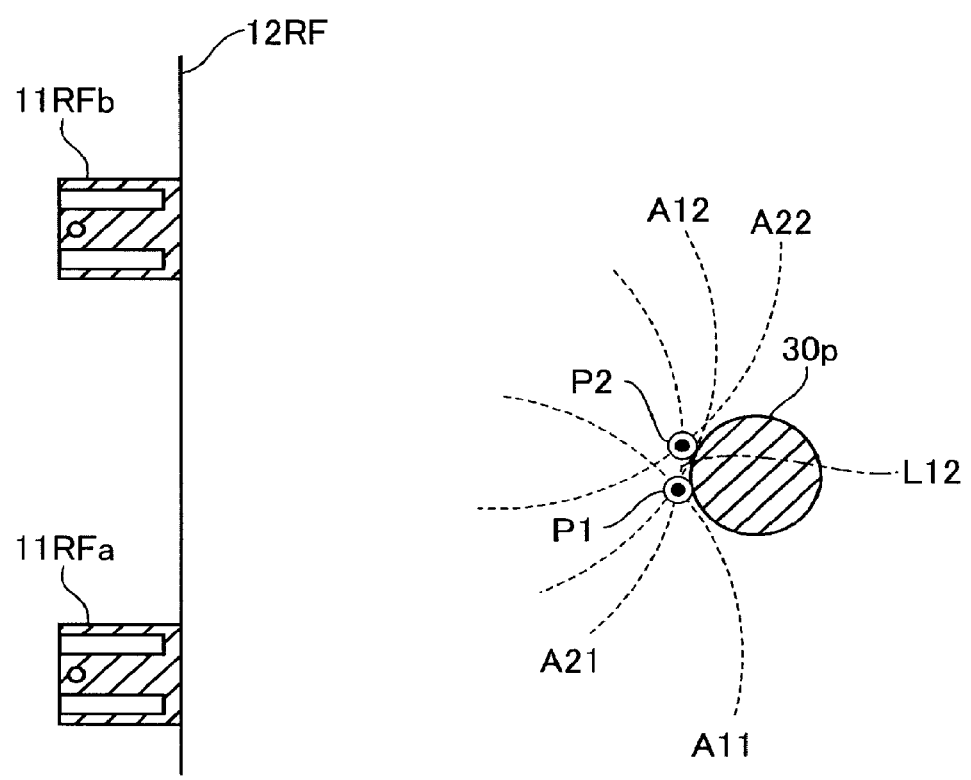
FIG. 10 is a view illustrating a state where an object is determined by the object detection unit according to the embodiment.

FIG. 10 is a view illustrating a state where the object 30p is determined by the object detection unit 20 according to the embodiment. As illustrated in FIG. 10, the distance between the obtained points P1 and P2 is less than a predetermined value. That is, the points P1 and P2 are very close to each other. From this, the object determination unit 22 determines that the object 30p is a rod-shaped object limited to a somewhat narrow range. Specifically, the object determination unit 22 of the object detection unit 20 determines, based on the obtained points P1 and P2, that the object 30p exists in a limited range on the line segment L12 interconnecting the points P1 and P2.

As described above, with reference to FIGS. 5A to 10, the object determination unit 22 of the object detection unit 20 determines the distance of an object detected by the transmission/reception units 11RFa and 11RFb from the door 12RF, the direction of the object, and the external shape of the object such as a wall surface shape or a pole shape. This is the same even when other transmission/reception units 11RBa, 11RBb, 11LFa, 11LFb, 11LBa, and 11LBb are used. The transmission/reception units 11RBa and 11RBb provided on the door 12RB operate in cooperation with each other to detect an object near the door 12RB. The transmission/reception units 11LFa and 11LFb provided on the door 12LF operate in cooperation with each other to detect an object near the door 12LF. The transmission/reception units 11LBa and 11RBb provided on the door 12LB operate in cooperation with each other to detect an object near the door 12LB. The object determination unit 22 determines the position and external shape of an object detected by the respective transmission/reception units 11.

(Collision Avoidance Method)

Next, a method of avoiding a collision between an object and the door 12 by the object detection device 1 will be described with reference to FIGS. 11A to 13B. Hereinafter, an example in which collision avoidance is performed mainly on an object determined based on operations of the transmission/reception units 11RFa and 11RFb will be described, but a collision may be avoided by the same method even when the other transmission/reception units 11RBa, 11RBb, 11LFa, 11LFb, 11LBa, and 11LBb are used.

As described above, when it is determined that an object that may be an obstacle exists near the door 12RF, the object detection device 1 performs collision avoidance according to the external shape of the object.

Figure 11A:
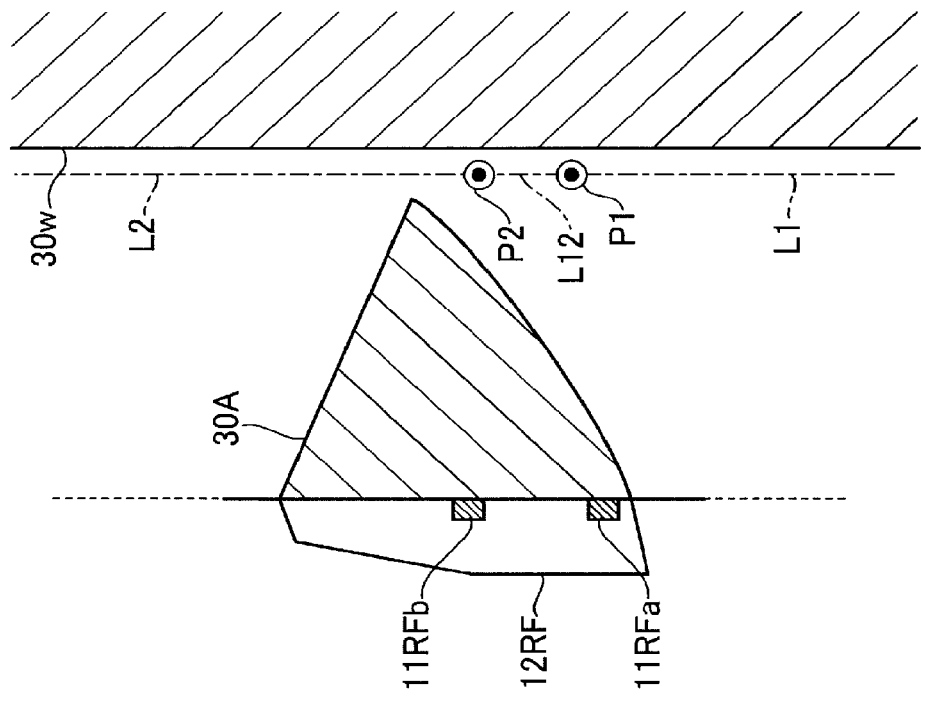
FIGS. 11A and 11B are views illustrating a state where a collision position between an object and a door is determined by the object detection unit according to the embodiment.
Figure 11B:
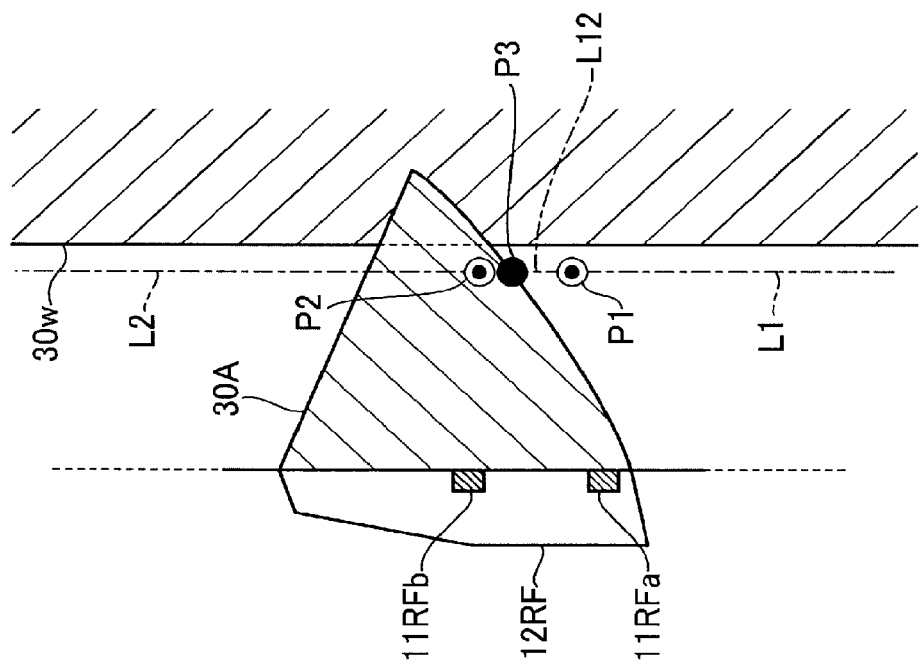

FIGS. 11A and 11B are views illustrating a state where a collision position between an object 30w and the door 12RF is determined by the object detection unit 20 according to the embodiment. In FIGS. 11A and 11B, it is assumed that the object 30w such as a wall surface is determined as existing near the door 12RF and being parallel to the door 12RF.

As illustrated in FIGS. 11A and 11B, the collision determination unit 23 of the object detection unit 20 determines whether or not there is a possibility that the door 12RF and the object collide when the door 12RF is opened. When there is a possibility that the door 12RF and the object collide, the collision determination unit 23 calculates a collision position between the door 12RF and the object.

Specifically, the collision determination unit 23 determines whether or not the detected object 30w exists within an area 30A surrounded by the fully closed position of the door 12RF, the fully opened position of the door 12RF, and the trace of the door 12RF when the door 12RF is opened or closed by referring to the door trace data 28 stored in the storage unit 25. When it is determined that the object 30w is a wall-shaped object, the object 30w is determined as existing not only on the line segment L12 between the points P1 and P2 but also on the line segments L1 and L2 obtained by extending both ends of the line segment L12. Thus, the collision determination unit 23 determines whether or not any of the line segments L1, L12, and L2 indicating the presence of the object 30w is included in the area 30A.

In FIG. 11A, the line segments L12 and L2 among the line segments L1, L12, and L2 are included in the area 30A. In addition, when the door 12RF is opened from the fully closed state, the door primally collides with a point P3 on the line segment L12. The collision determination unit 23 calculates the point P3 as a collision position. When the collision determination unit 23 calculates the collision position between the door 12RF and the object 30w, the door opening degree control unit 24 controls the door opening degree adjustment unit 13 to limit the opening degree of the door 12RF so that the door 12RF is stopped immediately before the collision position. Since the line segments L1, L12, and L2 are determined as being slightly closer to the door 12RF than the actual position of the object 30w, in consideration of this, the position where a collision may be sufficiently avoided is set to the limit position of the opening degree of the door 12RF.

In FIG. 11B, none of the line segments L1, L12, and L2 are included in the area 30A. Thus, the collision determination unit 23 does not calculate a collision position, and the door opening degree control unit 24 does not limit the opening degree of the door 12RF. That is, the door 12RF may be fully opened.

FIGS. 12A and 12B are views illustrating a state where a collision position between the object 30s and the door 12RF is determined by the object detection unit 20 according to the embodiment. In FIGS. 12A and 12B, it is assumed that the object 30s such as a wall surface is determined as existing near the door 12RF and being obliquely with respect to the door 12RF.

In FIG. 12A, all of the line segments L1, L12, and L2 are included in the area 30A. In addition, when the door 12RF is opened from the fully closed state, the door primally collides with a point P3 on the line segment L1. The collision determination unit 23 calculates the point P3 as a collision position. The door opening degree control unit 24 controls the door opening degree adjustment unit 13 to limit the opening degree of the door 12RF so that the door 12RF is stopped immediately before the collision position.

In FIG. 12B, none of the line segments L1, L12, and L2 are included in the area 30A. Thus, the collision determination unit 23 does not calculate the collision position, and the door opening degree control unit 24 does not limit the opening degree of the door 12RF.

Figure 13A:
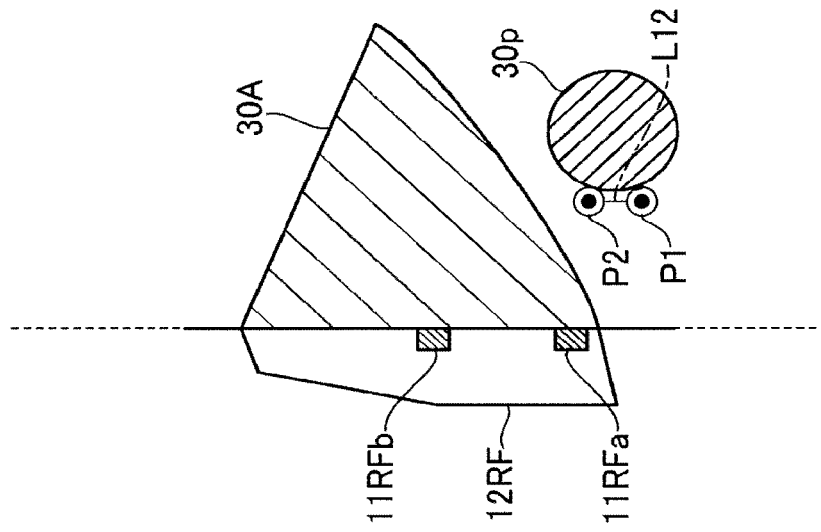
FIGS. 13A and 13B are views illustrating a state where a collision position between an object and a door is determined by the object detection unit according to the embodiment.
Figure 13B:
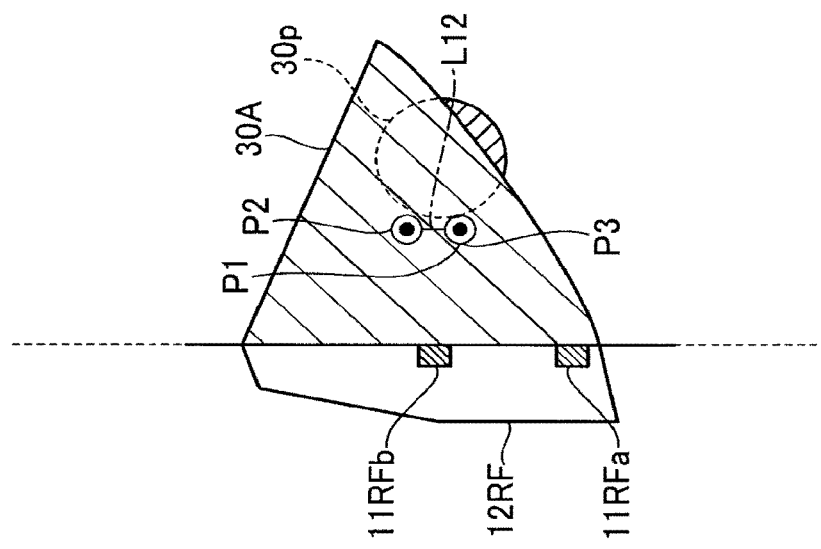

FIGS. 13A and 13B are views illustrating a state where a collision position between the object 30p and the door 12RF is determined by the object detection unit 20 according to the embodiment. In FIGS. 13A and 13B, it is assumed that the rod-shaped object 30p such as a pole being determined as existing near the door 12RF. When the object 30p is a pole-shaped object, it is determined that the object 30p exists only on the line segment L12 without considering the extension line of the line segment L12.

In FIG. 13A, the line segment L12 is included in the area 30A. In addition, when the door 12RF is opened from the fully closed state, the door primally collides with a point P3 that is superimposed on a point P1 on the line segment L12. The collision determination unit 23 calculates the point P3 as a collision position. The door opening degree control unit 24 controls the door opening degree adjustment unit 13 to limit the opening degree of the door 12RF so that the door 12RF is stopped immediately before the collision position.

In FIG. 13B, the line segment L12 is not included in the area 30A. Thus, the collision determination unit 23 does not calculate a collision position, and the door opening degree control unit 24 does not limit the opening degree of the door 12RF.

(Object Detection Processing by Object Detection Device)

Figure 14:
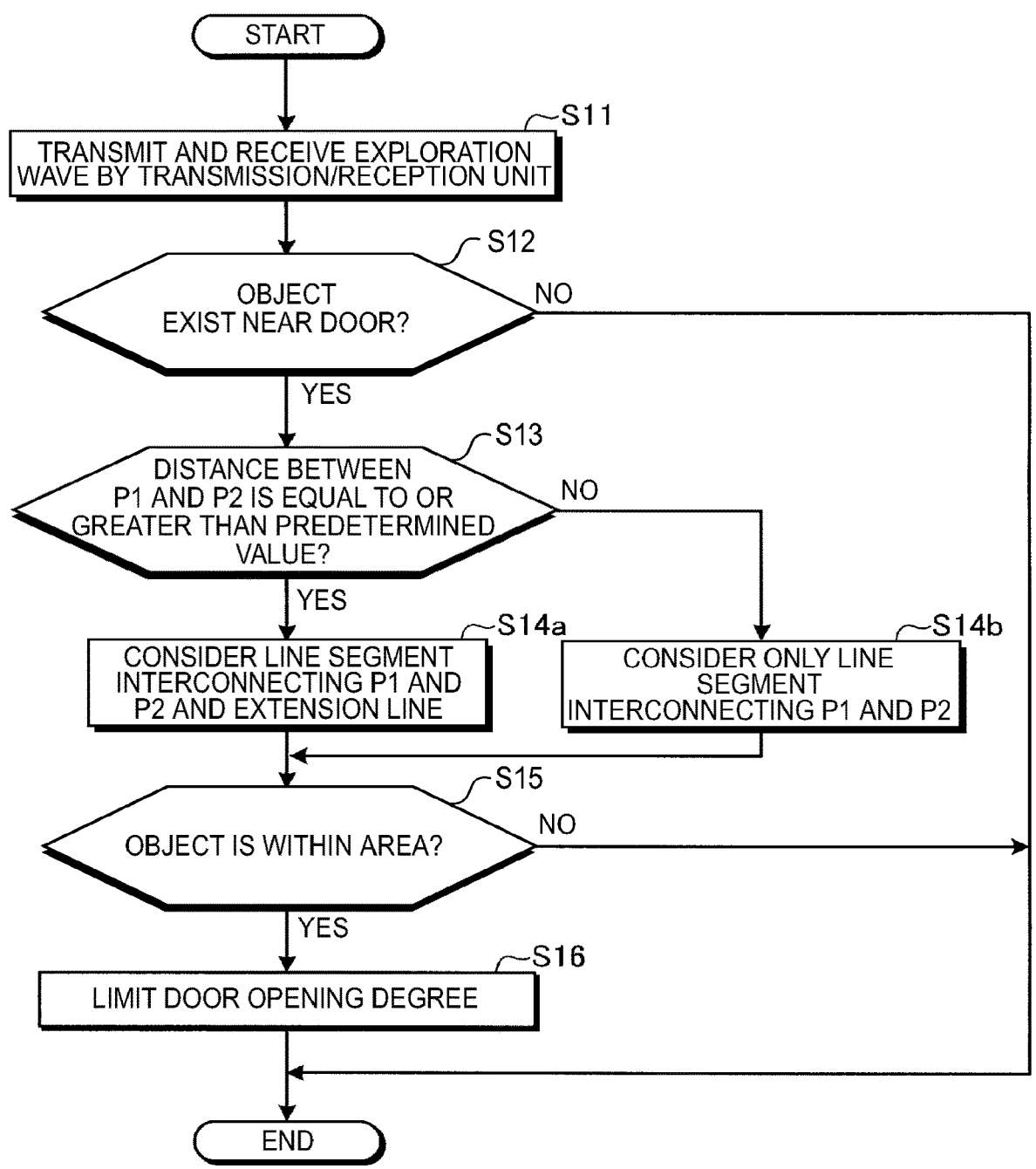
FIG. 14 is a flowchart illustrating an example of a procedure of an object detection processing by the object detection device according to the embodiment.

Next, an object detection processing by the object detection device 1 will be described with reference to FIG. 14. FIG. 14 is a flowchart illustrating an example of a procedure of an object detection processing by the object detection device 1 according to the embodiment.

As illustrated in FIG. 14, among the transmission/reception units 11 of the object detection device 1, the respective transmission/reception units 11 provided on the same door 12 alternately repeat a period for implementation of transmission and reception of an exploration wave and a period for implementation of only reception of an exploration wave (step S11). The object determination unit 22 of the object detection device 1 determines whether or not an object exists near the door 12 from obtained information on the exploration wave (step S12). When there is no object near the door 12 (step S12: No), the object detection device 1 ends the object detection processing. When there is an object near the door 12 (step S12: Yes), the object determination unit 22 determines whether or not the distance between the point P1 that is the intersection of the calculated arcs A11 and A12 and the point P2 that is the intersection of the calculated arcs A21 and A22 is equal to or greater than a predetermined value (step S13).

When the distance between the points P1 and P2 is equal to or greater than the predetermined value (step S13: Yes), the object determination unit 22 specifies the position and external shape of the object after considering the line segment L12 interconnecting the points P1 and P2 and the line segments L1 and L2 obtained by extending both ends of the line segment L12 (step S14a).

When the distance between the points P1 and P2 is less than the predetermined value (step S13: No), the object determination unit 22 specifies the position and external shape of the object after considering only the line segment L12 interconnecting the points P1 and P2 (step S14b).

The collision determination unit 23 determines whether or not the object exists in the area 30A based on the trace of the door 12 from the position and external shape of the object determined by the object determination unit 22 (step S15). When the object does not exist in the area 30A (step S15: No), the object detection device 1 ends the object detection processing. When the object exists in the area 30A (step S15: Yes), the door opening degree control unit 24 controls the door opening degree adjustment unit 13 to limit the opening degree of the door 12 (step S16).

In this way, the object detection device 1 ends the object detection processing.

(Object Detection Device of Comparative Example)

Figure 15:
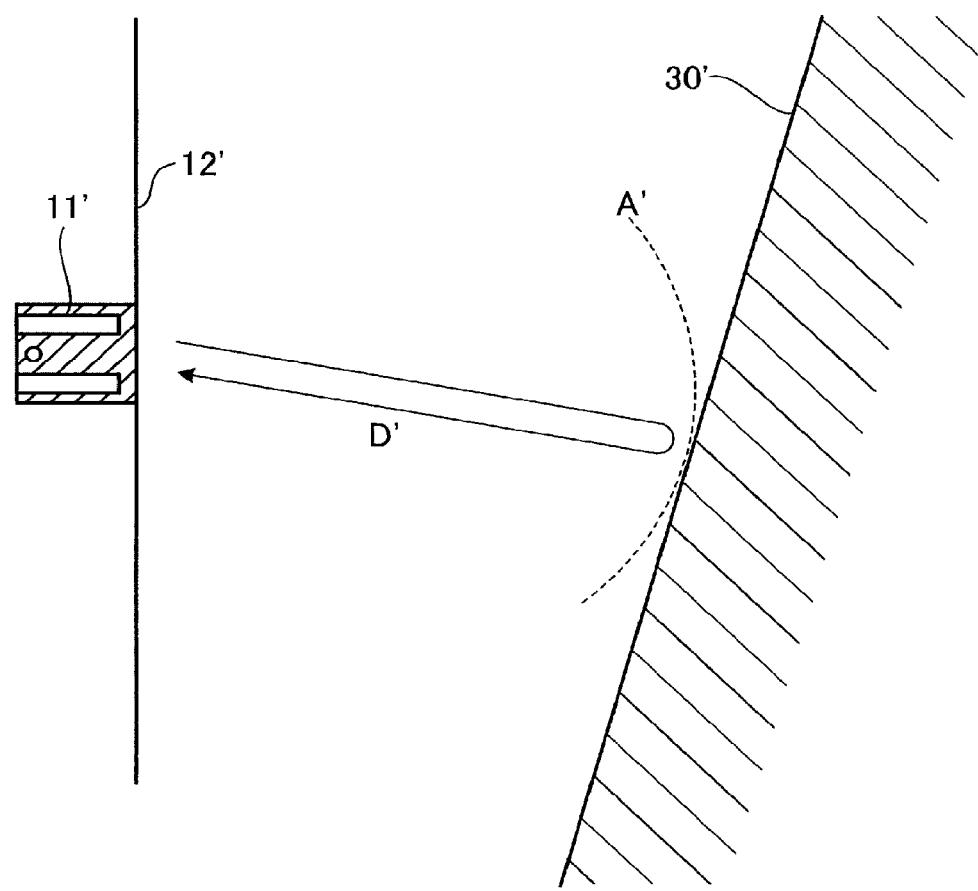
FIG. 15 is a view illustrating a state where an object is detected by an object detection device according to Comparative Example.

Next, an object detection device according to a comparative example will be described with reference to FIG. 15. The object detection device of the comparative example has only a single transmission/reception unit 11' for one door 12'. Such a single transmission/reception unit 11', however, may know only whether or not an object 30' exists near the door 12' or a distance D' to the object 30'. That is, the single transmission/reception unit 11' may know that the object 30' exists at any one position on an arc A', but may not know the direction and external shape of the object with respect to the door 12'. Thus, the opening degree of the door 12' is limited even when there is no possibility of a collision between the object and the door 12', or the opening degree of the door 12' is not limited even when there is a possibility of a collision between the object and the door 12'.

In the object detection device 1 according to the embodiment, two transmission/reception units 11RFa and 11RFb are provided for one door 12RF. Then, each of the two transmission/reception units 11RFa and 11RFb has two functions of transmission and reception. Thus, the exploration waves T11, T12, T22, and T21 may be obtained. Based on these, the object determination unit 22 may determine the presence and absence of the object 30$w$, 30$s$ or 30$p$, and the position and external shape of the object 30$w$, 30$s$ or 30$p$ with respect to the door 12RF.

In the object detection device 1 according to the embodiment, each of the transmission/reception units 11RFa and 11RFb alternately repeats a period for implementation of transmission and reception of an exploration wave and a period for implementation of only reception of an exploration wave. Thus, the exploration waves T11, T12, T22, and T21 may be obtained within a short time. Thus, for example, even when the object 30$w$, 30$s$ or 30$p$ approaches the door 12RF while the door 12RF is opened or closed, the object 30$w$, 30$s$ or 30$p$ may be detected in real time.

In the object detection device 1 according to the embodiment, it is possible to more accurately determine whether or not there is a possibility of a collision between the object and the door 12RF from the position and external shape of the determined object 30$w$, 30$s$ or 30$p$. Further, when there is a possibility of a collision between the object and the door 12RF, it is possible to more reliably avoid the door 12RF from colliding with the object 30$w$, 30$s$ or 30$p$ by limiting the opening degree of the door 12RF.

(Other Modifications)

In the above-described embodiment, the object detection unit 20 is configured by, for example, one ECU, but is not limited thereto. The object detection unit 20 may be configured by multiple ECUs. At this time, one ECU may be in charge of functions as the object determination unit 22 and the collision determination unit 23 of the object detection unit 20, and another ECU may be in charge of functions as the door opening degree control unit 24 of the object detection unit 20.

In the above-described embodiment, each of the transmission/reception units 11RFa and 11RFb alternately repeats a period for implementation of transmission and reception of an exploration wave and a period for implementation of only reception of an exploration wave, but is not limited thereto. In the above-described configuration, the exploration waves T11, T12, T21, and T22 may only need to be detected at least once, and the transmission/reception units 11RFa and 11RFb may sequentially detect the exploration waves T11, T12, T21, and T22 once. Alternatively, after the transmission/reception unit 11RFa continuously repeats transmission and reception multiple times to receive exploration waves T11 and T12 multiple times in succession, the transmission/reception unit 11RFb may continuously repeat transmission and reception multiple times to receive exploration waves T21 and T22 multiple times in succession. Alternatively, after the transmission/reception unit 11RFa continuously repeats transmission and reception multiple times to receive exploration waves T11 and T12 multiple times in succession, the transmission/reception unit 11RFb may perform transmission and reception only once to receive exploration waves T21 and T22 only once, and vice versa.

In the above-described embodiment, two transmission/reception units 11 are provided with respect to one door 12, but the disclosure is not limited thereto. For example, three or more transmission/reception units may be provided for one door. By increasing the number of transmission/reception units, a wider range of objects may be detected with higher accuracy.

In the above-described embodiment, multiple transmission/reception units 11 are provided on the door 12, but the disclosure is not limited thereto. The transmission/reception unit may be provided on another portion of a vehicle. At this time, for example, the transmission/reception units may be provided on a portion that rotates about a hinge as an axis such as a hatchback door on the rear of the vehicle.

In the above-described embodiment, multiple transmission/reception units 11 are provided on the door 12 of the vehicle 10, but the disclosure is not limited thereto. The transmission/reception units may be suitably used, for example, for all moving objects, a peripheral environment of which changes from time to time due to movement.

As described above, although the embodiment of the disclosure has been illustrated, the embodiment and modifications are merely examples and are not intended to limit the scope of the disclosure. The above-described embodiment or modifications may be implemented in various other forms, and various omissions, replacements, combinations, and changes may be made without departing from the gist of the disclosure. In addition, the configuration or shape of each embodiment or each modification may be partially replaced.

EXAMPLE

Next, an example will be described with reference to FIGS. 16 and 17. In the example, a device simulating the object detection device 1 of the above-described embodiment was assembled and a simulation test was performed.

Figure 16:
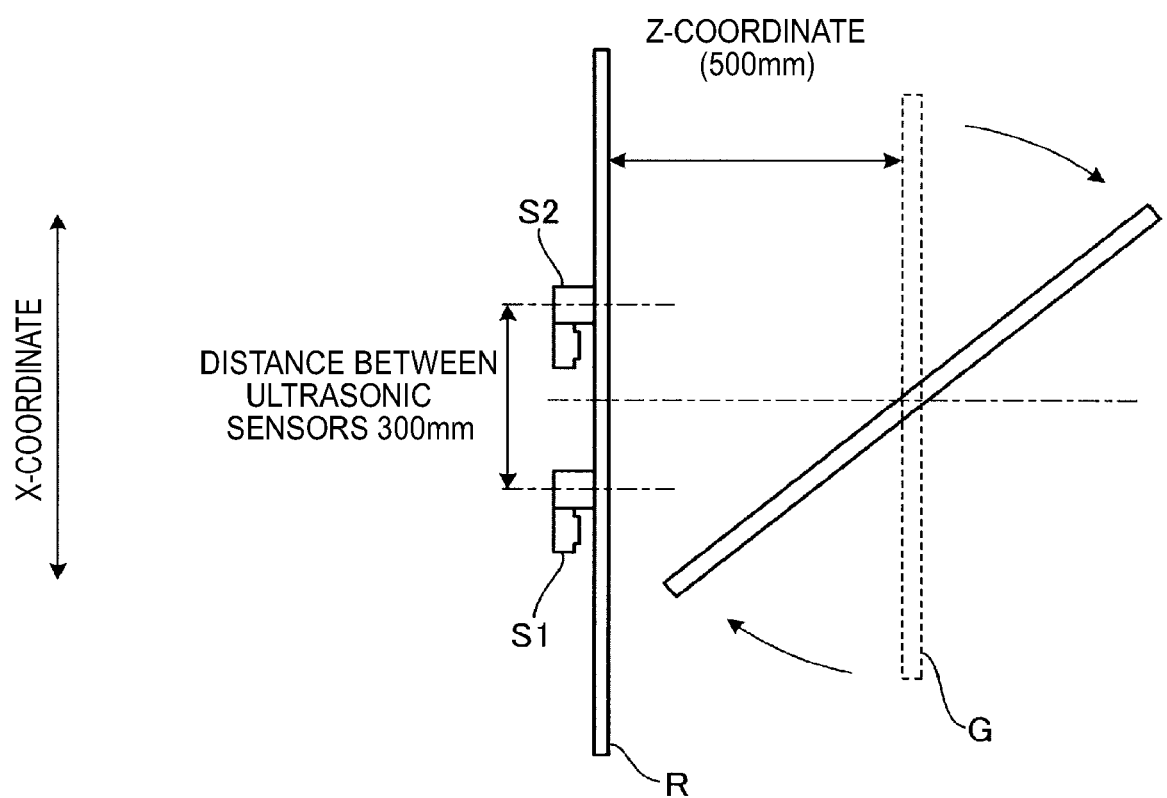
FIG. 16 is a view illustrating an evaluation environment in a simulation test of Example.

FIG. 16 is a view illustrating an evaluation environment in a simulation test of an example. As illustrated in FIG. 16, a resin plate R having a thickness of 3 mm was provided 500 mm away from a resin plate G, the angle of which may be arbitrarily changed, and ultrasonic sensors S1 and S2 were spaced apart from each other by 300 mm behind the resin plate R. The ultrasonic sensors S1 and S2 were adjusted to have the same function as the transmission/reception unit 11 of the above-described embodiment and to operate in cooperation with each other.

At this time, detection by the ultrasonic sensors S1 and S2 was attempted by tilting the resin plate G viewed as an obstacle by 45° with respect to the resin plate R. Then, the position of the resin plate G was calculated based on detected exploration waves with the same method as that in the above-described embodiment. FIG. 17 illustrates the calculation result at this time.

Figure 17:
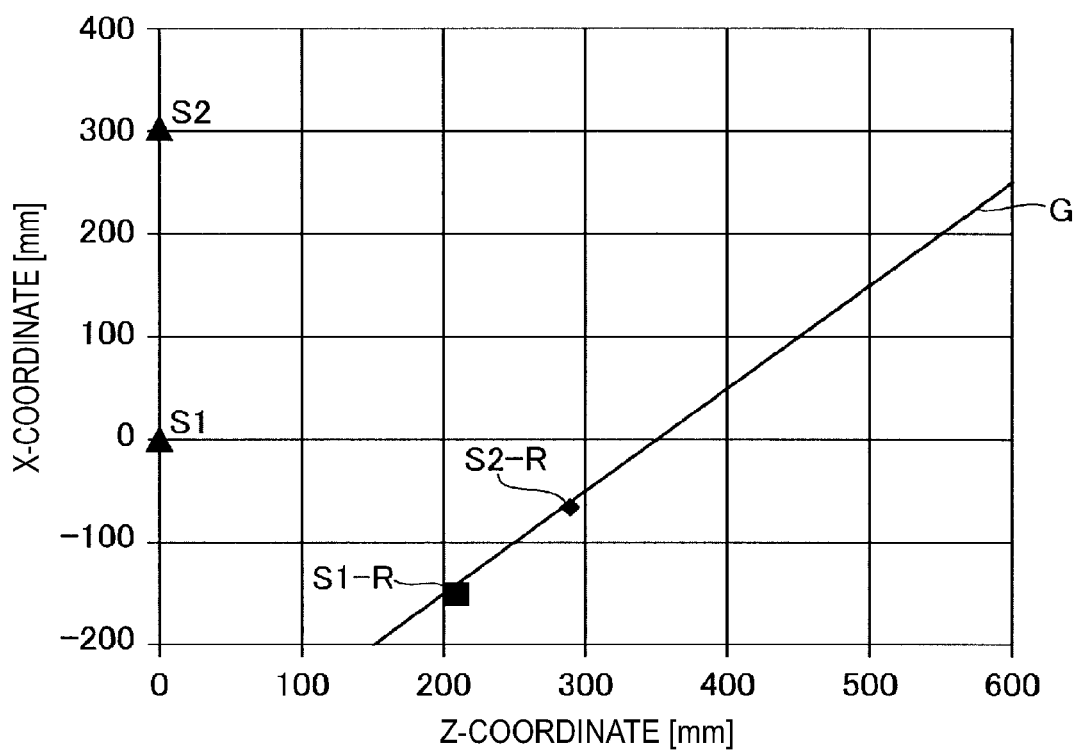
FIG. 17 is a graph illustrating a calculation result in the simulation test of Example.

In FIG. 17, the x-axis indicates the positions of the ultrasonic sensors S1 and S2. That is, the x-axis is substantially the same as the position of the resin plate R viewed as a door. On the other hand, the position of the resin plate G viewed as an obstacle is indicated by two points as detection positions S1-R and S2-R at the time of transmission and reception of the ultrasonic sensors S1 and S2. These two points correspond to the points P1 and P2 in the above-described embodiment, respectively. As described above, the detection positions S1-R and S2-R at the time of transmission and reception of the ultrasonic sensors S1 and S2 exist on a line indicating the position of the resin plate G when tilting the resin plate G by 45°. By connecting these two detection positions, it can be seen that a line along the position of the resin plate G is obtained and the obstacle is a wall-shaped object.

As described above, in the device simulating the object detection device 1 of the embodiment, the position and external shape of the resin plate G were correctly detected.

An object detection device according to an aspect of this disclosure includes, as an example, a first transmission/reception unit configured to transmit and receive an exploration wave to detect a peripheral object, a second transmission/reception unit spaced apart from the first transmission/reception unit by a predetermined distance and configured to transmit and receive an exploration wave to detect a peripheral object, and a processing unit configured to determine a position of an object based on reception results of the first transmission/reception unit and the second transmission/reception unit, and the processing unit is configured to calculate a first point based on a first exploration wave transmitted from the first transmission/reception unit and received primally by the first transmission/reception unit and a second exploration wave transmitted from the first transmission/reception unit and received primally by the second transmission/reception unit, calculate a second point based on a third exploration wave transmitted from the second transmission/reception unit and received primally by the second transmission/reception unit and a fourth exploration wave transmitted from the second transmission/reception unit and received primally by the first transmission/reception unit, determine that the object exists on a line segment interconnecting the first point and the second point when a distance between the first point and the second point is less than a predetermined value, and determine that the object exists on the line segment interconnecting the first point and the second point and line segments obtained by extending both ends of the line segment when the distance between the first point and the second point is equal to or greater than the predetermined value.

Accordingly, as an example, it is possible to improve the accuracy of determination of an object.

The processing unit may be configured to calculate a first shortest distance from the first transmission/reception unit to the object based on the first exploration wave, calculate a second shortest distance from the first transmission/reception unit to the second transmission/reception unit via the object based on the second exploration wave and calculate positions of third vertices of a plurality of triangles each including positions of the first transmission/reception unit and the second transmission/reception unit as two other vertices by a trilateration method, set, as the first point, an intersection of an arc whose distance from the first transmission/reception unit is the first shortest distance and an arc interconnecting the third vertices of the respective triangles calculated by the trilateration method, calculate a third shortest distance from the second transmission/reception unit to the object based on the third exploration wave, calculate a fourth shortest distance from the second transmission/reception unit to the first transmission/reception unit via the object based on the fourth exploration wave and calculate positions of third vertices of a plurality of triangles each including positions of the first transmission/reception unit and the second transmission/reception unit as two other vertices by the trilateration method, and set, as the second point, an intersection of an arc whose distance from the second transmission/reception unit is the third shortest distance and an arc interconnecting the third vertices of the respective triangles calculated by the trilateration method.

Accordingly, as an example, it is possible to determine the position and external shape of an object.

The first transmission/reception unit may operate to alternately repeat a period for implementation of transmission and reception of the exploration wave and a period for implementation of reception of the exploration wave, the second transmission/reception unit may operate to alternately repeat a period for implementation of transmission and reception of the exploration wave and a period for implementation of reception of the exploration wave, the first transmission/reception unit may perform transmission and reception of the exploration wave to receive the first exploration wave from the first transmission/reception unit for a period during which the second transmission/reception unit performs reception of the exploration wave, and perform reception of the exploration wave to receive the fourth exploration wave from the second transmission/reception unit for a period during which the second transmission/reception unit performs transmission and reception of the exploration wave, and the second transmission/reception unit may perform transmission and reception of the exploration wave to receive the third exploration wave from the second transmission/reception unit for a period during which the first transmission/reception unit performs reception of the exploration wave, and perform reception of the exploration wave to receive the second exploration wave from the first transmission/reception unit for a period during which the first transmission/reception unit performs transmission and reception of the exploration wave.

Accordingly, as an example, it is possible to obtain information on an exploration wave within a short time and thus, detect an object in real time.

The first transmission/reception unit may be provided on one of a hinge side or an opening/closing side of a door that is opened and closed by rotating around a hinge as an axis, the second transmission/reception unit may be provided on a remaining one of the hinge side and the opening/closing side of the door, and the processing unit may be configured to determine whether or not the object exists in an area surrounded by a fully closed position of the door, a fully opened position of the door, and a trace of the door when the door is opened or closed, and calculate a collision position between the object and the door when the object exists in the area.

Accordingly, as an example, it is possible to calculate a collision position between an object and a door with high accuracy.

The processing unit may be configured to limit an opening degree of the door based on the calculated collision position.

Accordingly, as an example, it is possible to avoid a collision between an object and a door with high accuracy.

The door may be provided on a vehicle.

Accordingly, as an example, even if the peripheral environment of a vehicle changes due to movement, it is possible to detect an object that may be an obstacle around a door with high accuracy and thus, avoid a collision between the object and the door.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
a first sensor configured to transmit and receive an exploration wave to detect a peripheral object;
a second sensor spaced apart from the first sensor by a predetermined distance and configured to transmit and receive an exploration wave to detect a peripheral object; and
circuitry configured to determine a position of an object based on reception results of the first sensor and the second sensor, wherein
the circuitry is configured to
calculate a first point based on a first exploration wave transmitted from the first sensor and received primarily by the first sensor and a second exploration wave transmitted from the first sensor and received primarily by the second sensor,
calculate a second point based on a third exploration wave transmitted from the second sensor and received primarily by the second sensor and a fourth exploration wave transmitted from the second sensor and received primarily by the first sensor,
determine that the object exists on a line segment interconnecting the first point and the second point when a distance between the first point and the second point is less than a predetermined value, and
determine that the object exists on the line segment interconnecting the first point and the second point and line segments obtained by extending both ends of the line segment when the distance between the first point and the second point is equal to or greater than the predetermined value.

2. The object detection device according to claim 1, wherein
the circuitry is configured to:
calculate a first shortest distance from the first sensor to the object based on the first exploration wave;
calculate a second shortest distance from the first sensor to the second sensor via the object based on the second exploration wave and calculate positions of third vertices of a plurality of triangles each including positions of the first sensor and the second sensor as two other vertices by a trilateration method;
set, as the first point, an intersection of an arc having a distance from the first sensor being the first shortest distance and an arc interconnecting the third vertices of the respective triangles calculated by the trilateration method;
calculate a third shortest distance from the second sensor to the object based on the third exploration wave;
calculate a fourth shortest distance from the second sensor to the first sensor via the object based on the fourth exploration wave and calculate positions of third vertices of a plurality of triangles each including positions of the first sensor and the second sensor as two other vertices by the trilateration method; and
set, as the second point, an intersection of an arc having a distance from the second sensor being the third shortest distance and an arc interconnecting the third vertices of the respective triangles calculated by the trilateration method.

3. The object detection device according to claim 1, wherein
- the first sensor operates to alternately repeat a period for implementation of transmission and reception of the exploration wave and a period for implementation of reception of the exploration wave,
- the second sensor operates to alternately repeat a period for implementation of transmission and reception of the exploration wave and a period for implementation of reception of the exploration wave,
- the first sensor performs transmission and reception of the exploration wave to receive the first exploration wave from the first sensor for a period during which the second sensor performs reception of the exploration wave, and performs reception of the exploration wave to receive the fourth exploration wave from the second sensor for a period during which the second sensor performs transmission and reception of the exploration wave, and
- the second sensor performs transmission and reception of the exploration wave to receive the third exploration wave from the second sensor for a period during which the first sensor performs reception of the exploration wave, and performs reception of the exploration wave to receive the second exploration wave from the first sensor for a period during which the first sensor performs transmission and reception of the exploration wave.

4. The object detection device according to claim 1, wherein
- the first sensor is provided on one of a hinge side or an opening/closing side of a door that is opened and closed by rotating around a hinge as an axis,
- the second sensor is provided on a remaining one of the hinge side and the opening/closing side of the door, and
- the circuitry is configured to:
    - determine whether or not the object exists in an area surrounded by a fully closed position of the door, a fully opened position of the door, and a trace of the door when the door is opened or closed; and
    - calculate a collision position between the object and the door when the object exists in the area.

5. The object detection device according to claim 4, wherein
- the circuitry is configured to limit an opening degree of the door based on the calculated collision position.

6. The object detection device according to claim 4, wherein
- the door is provided on a vehicle.

* * * * *